(12) United States Patent
Kim

(10) Patent No.: US 10,009,534 B2
(45) Date of Patent: Jun. 26, 2018

(54) DEVICE AND METHOD FOR DETECTING FOCUS OF ELECTRONIC DEVICE

(71) Applicant: Samsung Electronics Co., Ltd., Gyeonggi-do (KR)

(72) Inventor: Sungeun Kim, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 0 days. days.

(21) Appl. No.: 15/041,478

(22) Filed: Feb. 11, 2016

(65) Prior Publication Data

US 2016/0241776 A1    Aug. 18, 2016

(30) Foreign Application Priority Data

Feb. 13, 2015    (KR) .................. 10-2015-0022449

(51) Int. Cl.
*H04N 5/232* (2006.01)
*G06K 9/00* (2006.01)

(52) U.S. Cl.
CPC ..... *H04N 5/23212* (2013.01); *G06K 9/00228* (2013.01); *H04N 5/23219* (2013.01); *H04N 5/23293* (2013.01)

(58) Field of Classification Search
None
See application file for complete search history.

(56) References Cited

U.S. PATENT DOCUMENTS

| 2011/0221952 | A1* | 9/2011 | Hamada | H04N 5/23209 348/345 |
| 2012/0188408 | A1* | 7/2012 | Nakaoka | G02B 7/28 348/231.99 |
| 2012/0242852 | A1* | 9/2012 | Hayward | H04N 5/23212 348/222.1 |
| 2013/0004082 | A1* | 1/2013 | Kano | G06T 5/002 382/195 |
| 2013/0100338 | A1* | 4/2013 | Iwasaki | G03B 3/10 348/353 |
| 2013/0155276 | A1* | 6/2013 | Ueda | G02B 7/36 348/223.1 |
| 2014/0050403 | A1* | 2/2014 | Ulusoy | G06T 7/0081 382/173 |
| 2014/0071303 | A1* | 3/2014 | Hasegawa | H04N 5/23212 348/208.11 |
| 2014/0105454 | A1* | 4/2014 | Yoneyama | G06K 9/00664 382/103 |
| 2014/0146213 | A1* | 5/2014 | Ueda | H04N 5/23293 348/333.02 |

(Continued)

FOREIGN PATENT DOCUMENTS

KR    10-2010-0094201 A    8/2010
KR    10-2014-0123302 A    10/2014

*Primary Examiner* — Timothy J Henn
(74) *Attorney, Agent, or Firm* — Cha & Reiter, LLC

(57) ABSTRACT

An electronic device comprising: a memory; a display; a camera; and at least one processor operatively coupled to the memory, configured to: acquire a preview image by using the camera; display the preview image on the display; identify a plurality of areas in the preview image that satisfy a predetermined condition; and modify a focus detection area associated with the camera to include the plurality of areas.

14 Claims, 27 Drawing Sheets

(56) References Cited

U.S. PATENT DOCUMENTS

| | | | |
|---|---|---|---|
| 2014/0152883 A1* | 6/2014 | Jones | G06F 3/04883 |
| | | | 348/333.08 |
| 2014/0176783 A1* | 6/2014 | Shibagami | H04N 5/23212 |
| | | | 348/349 |
| 2014/0307126 A1 | 10/2014 | Son et al. | |
| 2015/0054978 A1* | 2/2015 | Shibagami | G02B 7/365 |
| | | | 348/222.1 |
| 2015/0358549 A1* | 12/2015 | Cho | H04N 5/23293 |
| | | | 348/333.11 |
| 2016/0014359 A1* | 1/2016 | Ota | H04N 5/3696 |
| | | | 348/223.1 |
| 2016/0142618 A1* | 5/2016 | Tokui | G02B 7/36 |
| | | | 348/349 |

* cited by examiner

FIG.11B

DEVICE AND METHOD FOR DETECTING FOCUS OF ELECTRONIC DEVICE

CLAIM OF PRIORITY

This application claims the priority under 35 U.S.C. § 119(a) to Korean Application Serial No. 10-2015-0022449, which was filed in the Korean Intellectual Property Office on Feb. 13, 2015, the entire content of which is hereby incorporated by reference.

TECHNICAL FIELD

The present disclosure relates to electronic devices, in general, and more particularly to device and method for detecting focus of electronic device.

BACKGROUND

As digital technologies have developed, various types of electronic devices are widely utilized, such as a smart phone, a tablet Personal Computer (PC), a Personal Digital Assistant (PDA), an electronic organizer, a notebook, a wearable device, or the like. The electronic devices have reached the level of mobile convergence which includes the functions of other devices. For example, an electronic device can provide a call function such as a voice call and a video call, a message transmission/reception function such as a Short Message Service (SMS)/Multimedia Message Service (MMS) and an electronic mail (e-mail), an electronic organizer function, a photography function, a broadcast reproduction function, video playing function, music playing function, an Internet function, a messenger function, a game function, a Social Networking Service (SNS) function, and the like.

An electronic device having a photography function may have a camera supporting an auto focus (AF) function. When an AF is performed in the electronic device, the AF may configure a focus area for which the AF is performed in advance. For example, the focus area may be the central area of an LCD or view finder, a touched area, a face recognition area, or the like.

However, an AF processing method of a conventional electronic device uses a method which configures an AF area and focuses on a subject in the configured AF area.

An AF processing method of an electronic device can designate and deploy an AF area in a particular area of a screen (e.g., the center of a screen, a face recognition or a user selected location), and focus on subjects in the designated AF area. In this case, if a subject is not accurately located within the AF area and is biased or has a size narrower than the AF area, the electronic device cannot accurately perform an AF function due to by undesired image information in a configured AF area. In addition, in a case where a face recognition AF method is used, if an AF area which has been recognized as a face area cannot be accurately configured, the electronic device may cause an AF failure. Further, even in a case where a target subject is properly located in the configured AF area, an AF failure may occur. For example, when a configured AF area is slightly dark or is too bright, an electronic device cannot sufficiently acquire AF caldulation data and thus may cause an AF failure. Further, when a subject in a configured AF area moves, an electronic device cannot perform an AF for the moving subject.

SUMMARY

According to aspects of the disclosure, an electronic device is provided comprising: a memory; a display; a camera; and at least one processor operatively coupled to the memory, configured to: acquire a preview image by using the camera; display the preview image on the display; identify a plurality of areas in the preview image that satisfy a predetermined condition; and modify a focus detection area associated with the camera to include the plurality of areas.

According to aspects of the disclosure, an electronic device is provided comprising: a memory; a camera; an input/output module; and at least one processor operatively coupled to the memory, configured to: acquire an image in accordance with a focus detection area while the electronic device is in a first focus state; display the image on the input/output module; detect an input for tracking a subject depicted in the image, the input selecting an area in the image in which the subject is depicted; transition the electronic device into a second focus state for tracking the subject in response to the input; and modify the focus detection area based on subject image property information associated with the area.

According to aspects of the disclosure, a method for use in an electronic device is provided, comprising: acquiring a preview image by using a camera of the electronic device; displaying the preview image on a display of the electronic device; identifying a plurality of areas in the preview image that satisfy a predetermined condition; and modifying a focus detection area associated with the camera to include the plurality of areas.

According to aspects of the disclosure, a method for use in an electronic device is provided, comprising: acquiring an image in accordance with a focus detection area while the electronic device is in a first focus state; displaying the image on a display of the electronic device; detecting an input for tracking a subject depicted in the image, the input selecting an area in the image in which the subject is depicted; transitioning the electronic device into a second focus state for tracking the subject in response to the input; and modifying the focus detection area based on subject image property information associated with the area.

BRIEF DESCRIPTION OF THE DRAWINGS

The above and other aspects, features, and advantages of the present disclosure will be more apparent from the following detailed description taken in conjunction with the accompanying drawings, in which:

FIG. 11B is a diagram illustrating an example of a process for modifying a focus detection area, according to various embodiments of the present disclosure;

DETAILED DESCRIPTION

Figure 1:
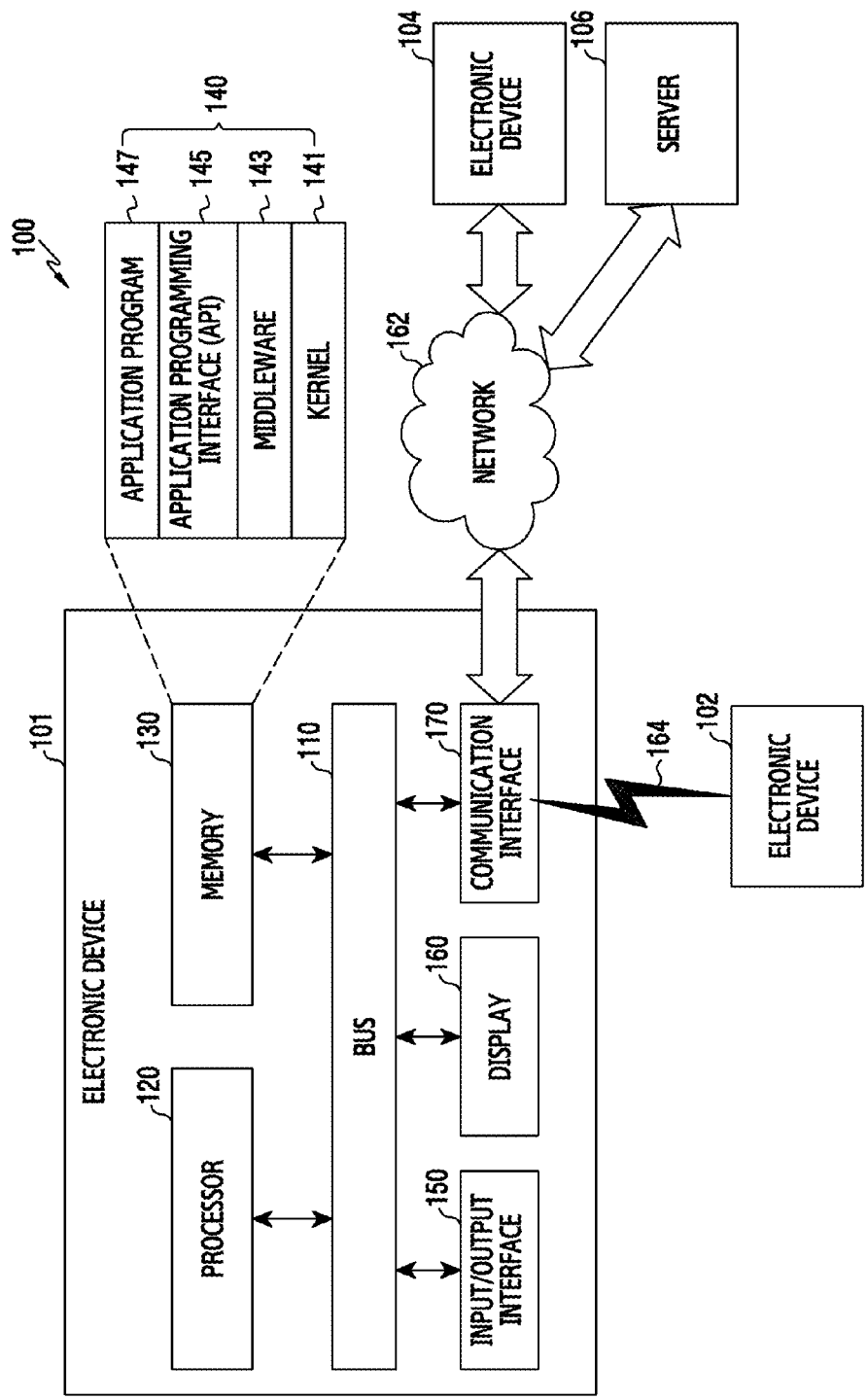
FIG. 1 is a diagram of an example of a network environment, according to various embodiments of the present disclosure.

Hereinafter, various embodiments of the present disclosure will be described with reference to the accompanying drawings. However, it should be understood that there is no intent to limit the present disclosure to the particular forms disclosed herein; rather, the present disclosure should be construed to cover various modifications, equivalents, and/or alternatives of embodiments of the present disclosure. In describing the drawings, similar reference numerals may be used to designate similar constituent elements.

As used herein, the expression "have", "may have", "include", or "may include" refers to the existence of a corresponding feature (e.g., numeral, function, operation, or constituent element such as component), and does not exclude one or more additional features.

In the present disclosure, the expression "A or B", "at least one of A or/and B", or "one or more of A or/and B" may include all possible combinations of the items listed. For example, the expression "A or B", "at least one of A and B", or "at least one of A or B" refers to all of (1) including at least one A, (2) including at least one B, or (3) including all of at least one A and at least one B.

The expression "a first", "a second", "the first", or "the second" used in various embodiments of the present disclosure may modify various components regardless of the order and/or the importance but does not limit the corresponding components. For example, a first user device and a second user device indicate different user devices although both of them are user devices. For example, a first element may be termed a second element, and similarly, a second element may be termed a first element without departing from the scope of the present disclosure.

It should be understood that when an element (e.g., first element) is referred to as being (operatively or communicatively) "connected," or "coupled," to another element (e.g., second element), it may be directly connected or coupled directly to the other element or any other element (e.g., third element) may be interposed between them. In contrast, it may be understood that when an element (e.g., first element) is referred to as being "directly connected," or "directly coupled" to another element (second element), there are no element (e.g., third element) interposed between them.

The expression "configured to" used in the present disclosure may be exchanged with, for example, "suitable for", "having the capacity to", "designed to", "adapted to", "made to", or "capable of" according to the situation. The term "configured to" may not necessarily imply "specifically designed to" in hardware. Alternatively, in some situations, the expression "device configured to" may mean that the device, together with other devices or components, "is able to". For example, the phrase "processor adapted (or configured) to perform A, B, and C" may mean a dedicated processor (e.g. embedded processor) only for performing the corresponding operations or a generic-purpose processor (e.g., central processing unit (CPU) or application processor (AP)) that can perform the corresponding operations by executing one or more software programs stored in a memory device.

The terms used in the present disclosure are only used to describe specific embodiments, and are not intended to limit the present disclosure. As used herein, singular forms may include plural forms as well unless the context clearly indicates otherwise. Unless defined otherwise, all terms used herein, including technical and scientific terms, have the same meaning as those commonly understood by a person skilled in the art to which the present disclosure pertains. Such terms as those defined in a generally used dictionary may be interpreted to have the meanings equal to the contextual meanings in the relevant field of art, and are not to be interpreted to have ideal or excessively formal meanings unless clearly defined in the present disclosure. In some cases, even the term defined in the present disclosure should not be interpreted to exclude embodiments of the present disclosure.

An electronic device according to various embodiments of the present disclosure may include at least one of, for example, a smart phone, a tablet Personal Computer (PC), a mobile phone, a video phone, an electronic book reader (e-book reader), a desktop PC, a laptop PC, a netbook computer, a workstation, a server, a Personal Digital Assistant (PDA), a Portable Multimedia Player (PMP), a MPEG-1 audio layer-3 (MP3) player, a mobile medical device, a camera, and a wearable device. According to various embodiments, the wearable device may include at least one of an accessory type (e.g., a watch, a ring, a bracelet, an anklet, a necklace, a glasses, a contact lens, or a Head-Mounted Device (HMD)), a fabric or clothing integrated type (e.g., an electronic clothing), a body-mounted type (e.g., a skin pad, or tattoo), and a bio-implantable type (e.g., an implantable circuit).

According to some embodiments, the electronic device may be a home appliance. The home appliance may include at least one of, for example, a television, a Digital Video Disk (DVD) player, an audio, a refrigerator, an air conditioner, a vacuum cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ and PlayStation™), an electronic dictionary, an electronic key, a camcorder, and an electronic photo frame.

According to another embodiment, the electronic device may include at least one of various medical devices (e.g., various portable medical measuring devices (a blood glucose monitoring device, a heart rate monitoring device, a blood pressure measuring device, a body temperature measuring device, etc.), a Magnetic Resonance Angiography (MRA), a Magnetic Resonance Imaging (MRI), a Computed Tomography (CT) machine, and an ultrasonic machine), a navigation device, a Global Positioning System (GPS) receiver, an Event Data Recorder (EDR), a Flight Data Recorder (FDR), a Vehicle Infotainment Devices, electronic devices for a ship (e.g., a navigation device for a ship, and a gyro-compass), avionics, security devices, an automotive head unit, a robot for home or industry, an automatic teller's machine (ATM) in banks, point of sales (POS) in a shop, or internet device of things (e.g., a light bulb, various sensors, electric or gas meter, a sprinkler device, a fire alarm, a thermostat, a street lamp, a toaster, a sporting goods, a hot water tank, a heater, a boiler, etc.).

According to some embodiments, the electronic device may include at least one of a part of furniture or a building/structure, an electronic board, an electronic signature receiving device, a projector, and various kinds of measuring instruments (e.g., a water meter, an electric meter, a gas meter, and a radio wave meter). The electronic device according to various embodiments of the present disclosure may be a combination of one or more of the aforementioned various devices. The electronic device according to some embodiments of the present disclosure may be a flexible device. Further, the electronic device according to an embodiment of the present disclosure is not limited to the aforementioned devices, and may include a new electronic device according to the development of technology.

Hereinafter, an electronic device according to various embodiments will be described with reference to the accompanying drawings. As used herein, the term "user" may indicate a person who uses an electronic device or a device (e.g., an artificial intelligence electronic device) that uses an electronic device.

FIG. 1 is a diagram of an example of a network environment, according to various embodiments of the present disclosure.

An electronic device 101 within a network environment 100, according to various embodiments, will be described with reference to FIG. 1. The electronic device 101 may include a bus 110, a processor 120, a memory 130, an input/output interface 150, a display 160, and a communication interface 170. According to an embodiment of the present disclosure, the electronic device 101 may omit at least one of the above components or may further include other components.

The bus 110 may include, for example, a circuit which interconnects the components 110 to 170 and delivers a communication (e.g., a control message and/or data) between the components 110 to 170. While a tracking mode is being performed like 1330 of FIG. 13, if a random area in a screen is selected like 1340 of FIG. 13, the electronic device may sense the selection like 1350 and return to a previous focus detection mode (e.g., a center focus detection mode).

Figure 13:
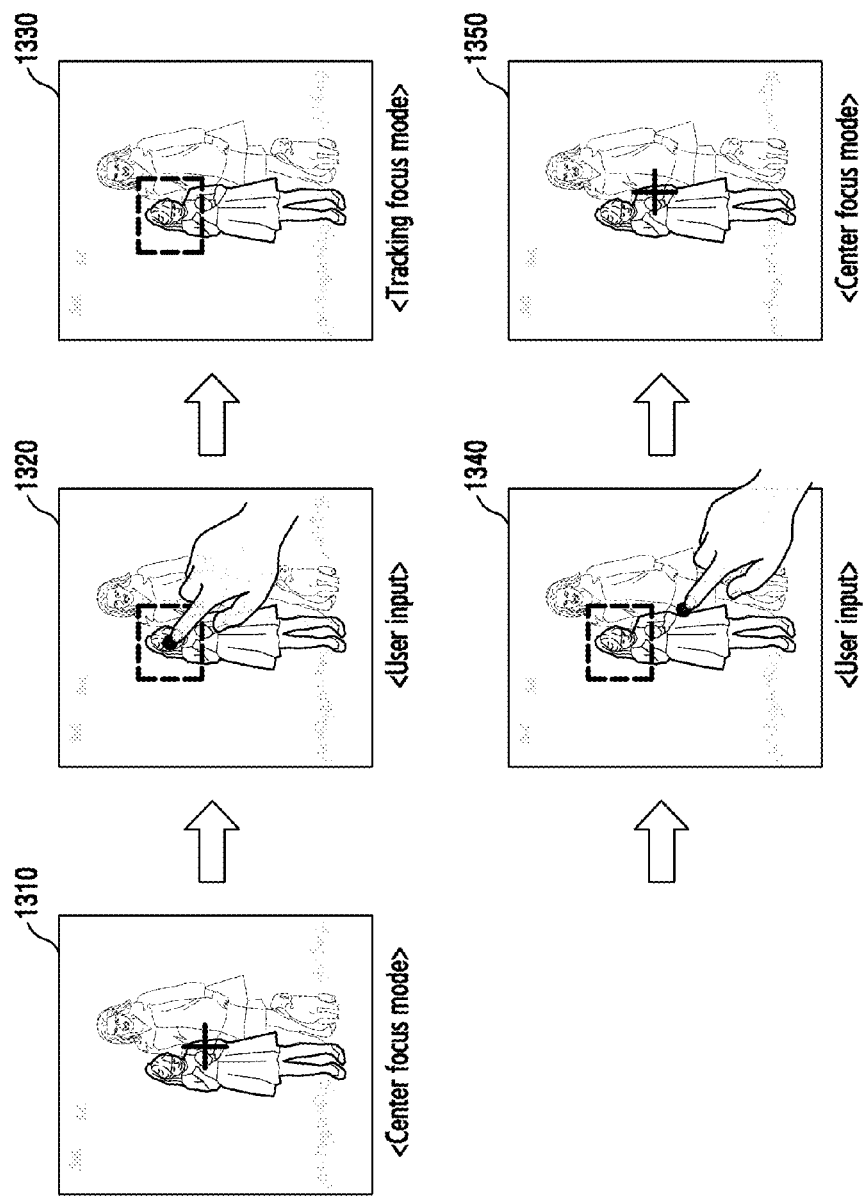
FIG. 13 is a diagram illustrating an example of a process for changing the focus mode of an electronic device, according to various embodiments of the present disclosure.
Figure 14:
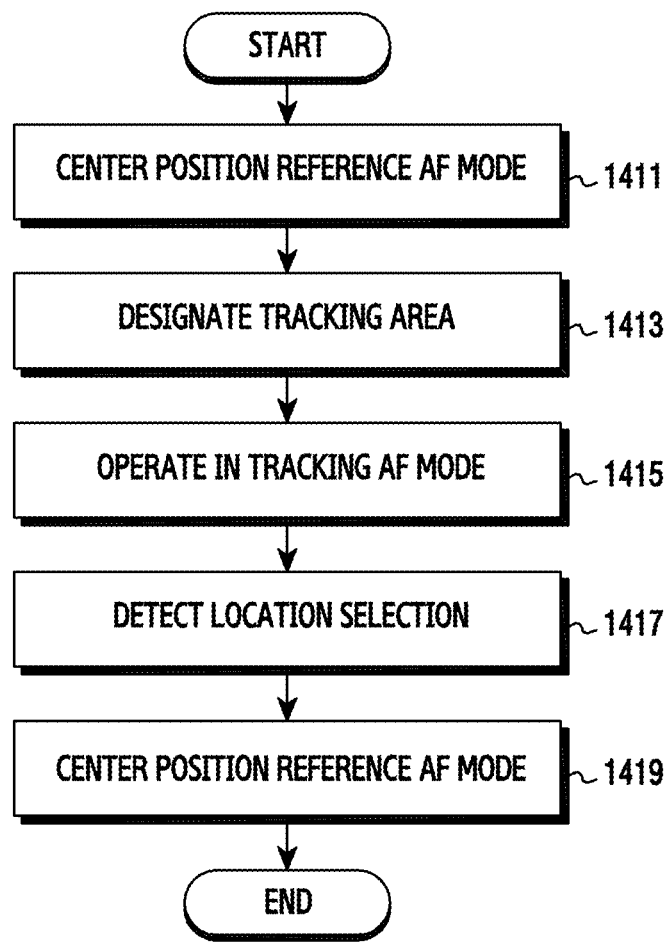
FIG. 14 is a flowchart of an example of a process, according to various embodiments of the present disclosure.

FIG. 14 is a flowchart illustrating a tracking mode entry through a single input and an area designation method among the entire operations of the present disclosure of FIG. 13.

The processor 120 may include any suitable type of processing circuitry, such as one or more general-purpose processors (e.g., ARM-based processors), a Digital Signal Processor (DSP), a Programmable Logic Device (PLD), an Application-Specific Integrated Circuit (ASIC), a Field-Programmable Gate Array (FPGA), etc. Additionally or alternatively, the processor 120 may include one or more of a Central Processing Unit (CPU), an Application Processor (AP), and a Communication Processor (CP). The processor 120 may carry out, for example, calculation or data processing relating to control and/or communication of at least one other component of the electronic device 101.

The memory 130 may include any suitable type of volatile or non-volatile memory, such as Random-access Memory (RAM), Read-Only Memory (ROM), Network Accessible Storage (NAS), cloud storage, a Solid State Drive (SSD), etc. The memory 130 may store, for example, a command or data relevant to at least one other component of the electronic device 101. According to an embodiment of the present disclosure, the memory 130 may store software and/or a program 140. A program 140, for example, may include a kernel 140, a middleware 143, an application programming interface (API) 145, an application program (or "application") 147 and/or the like. At least some of the kernel 141, the middleware 143, and the API 145 may be referred to as an Operating System (OS).

The kernel 141 may control or manage system resources (e.g., the bus 110, the processor 120, or the memory 130) used for performing an operation or function implemented in the other programs (e.g., the middleware 143, the API 145, or the application programs 147). Furthermore, the kernel 141 may provide an interface through which the middleware 143, the API 145, or the application programs 147 may access the individual components of the electronic device 101 to control or manage the system resources.

The middleware 143, for example, may serve as an intermediary for allowing the API 145 or the application programs 147 to communicate with the kernel 141 to exchange data.

Also, the middleware 143 may process one or more task requests received from the application programs 147 according to priorities thereof. For example, the middleware 143 may assign priorities for using the system resources (e.g., the bus 110, the processor 120, the memory 130, or the like) of the electronic device 101, to at least one of the application programs 147. For example, the middleware 143 may perform scheduling or load balancing on the one or more task requests by processing the one or more task requests according to the priorities assigned thereto.

The API 145, for example, is an interface for controlling a function provided by the kernel 141 or the middleware 143 by the application 147 and may include at least one of interfaces or functions (e.g., a command) for file control, window control, image processing, character control or the like, for example.

The input/output interface 150, for example, may function as an interface that may transfer a command or data input from a user or another external device to the other element(s) of the electronic device 101. Furthermore, the input/output interface 150 may output the command or data received from the other element(s) of the electronic device 101 to the user or another external device. The input/output interface 150 may include an input device like a touch panel, a data input device like a camera module and the like.

Examples of the display 160 may include a Liquid Crystal Display (LCD), a Light-Emitting Diode (LED) display, an Organic Light-Emitting Diode (OLED) display, a MicroElectroMechanical Systems (MEMS) display, and an electronic paper display. The display 160, for example, may display a variety of contents (e.g., text, image, video, icon, symbol or the like). The display 160 may include a touch screen, and may receive, for example, a touch, gesture, proximity, or hovering input using an electronic pen or a user's body part.

A communication interface 170, for example, may configure a communication between an electronic device 101 and an external device (e.g., a first external electronic device 102, a second external electronic device 104, or a server 106). For example, the communication interface 170 may be connected to a network 162 through wireless or wired communication, and may communicate with an external device (e.g., the second external electronic device 104 or the server 106).

The wireless communication may use at least one of, for example, Long Term Evolution (LTE), LTE-Advance (LTE-A), Code Division Multiple Access (CDMA), Wideband CDMA (WCDMA), Universal Mobile Telecommunications System (UMTS), Wireless Broadband (WiBro), and Global System for Mobile Communications (GSM), as a cellular communication protocol. In addition, the wireless communication may include, for example, short-range communication 164. The short-range communication 164 may include at least one of, for example, Wi-Fi, Bluetooth, Near Field Communication (NFC), and Global Navigation Satellite System (GNSS). GNSS may include, for example, at least one of global positioning system (GPS), global navigation satellite system (Glonass), Beidou Navigation satellite system (Beidou) or Galileo, and the European global satellite-based navigation system, based on a location, a bandwidth, or the like. Hereinafter, in the present disclosure, the "GPS" may be interchangeably used with the "GNSS". The wired communication may include, for example, at least one of a Universal Serial Bus (USB), a High Definition Multimedia Interface (HDMI), Recommended Standard 232 (RS-232), and a Plain Old Telephone Service (POTS). The network 162 may include at least one of a communication network such as a computer network (e.g., a LAN or a WAN), the Internet, and a telephone network.

Each of the first and second external electronic devices 102 and 104 may be of a type identical to or different from that of the electronic device 101. According to an embodiment of the present disclosure, the server 106 may include a group of one or more servers. According to various embodiments of the present disclosure, all or some of the operations performed in the electronic device 101 may be executed by another electronic device or a plurality of electronic devices (e.g., the electronic devices 102 and 104 or the server 106). According to an embodiment of the present disclosure, when the electronic device 101 has to perform some functions or services automatically or in response to a request, the electronic device 101 may request another device (e.g., the electronic device 102 or 104 or the server 106) to execute at least some functions relating thereto instead of or in addition to autonomously performing the functions or services. Another electronic device (e.g., the electronic device 102 or 104, or the server 106) may execute the requested functions or the additional functions, and may deliver a result of the execution to the electronic device 101. The electronic device 101 may process the received result as it is or additionally, and may provide the requested functions or services. To this end, for example, cloud computing, distributed computing, or client-server computing technologies may be used.

Figure 2:
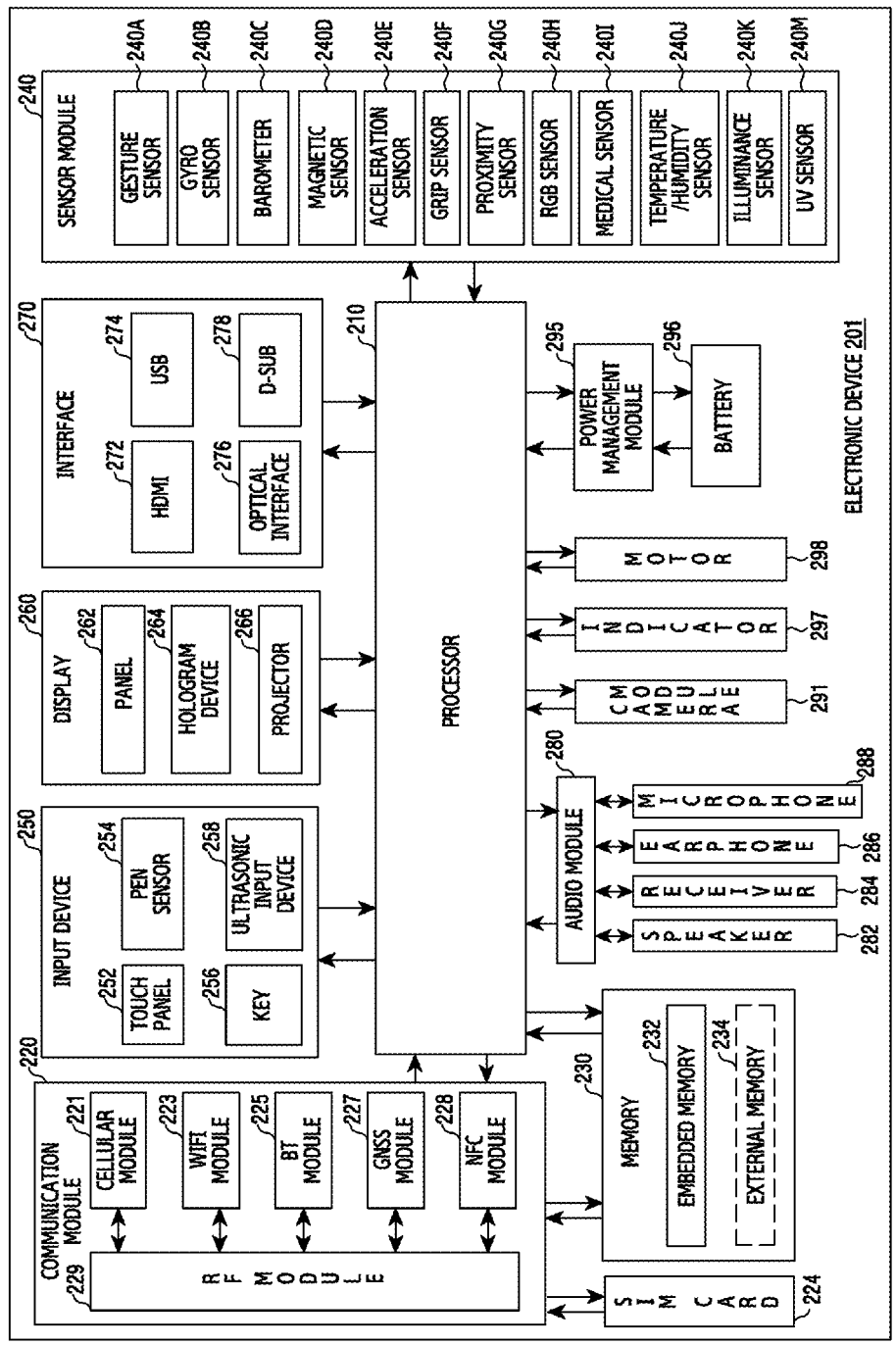
FIG. 2 is a diagram of an example of an electronic device, according to various embodiments of the present disclosure.

FIG. 2 is a block diagram of an example of an electronic device, according to various embodiments of the present disclosure.

The electronic device 201 may include, for example, all or a part of the electronic device 101 shown in FIG. 1. The electronic device 201 may include one or more processors 210 (e.g., Application Processors (AP)), a communication module 220, a Subscriber Identification Module (SIM) 224, a memory 230, a sensor module 240, an input device 250, a display 260, an interface 270, an audio module 280, a camera module 291, a power management module 295, a battery 296, an indicator 297, and a motor 298.

The processor 210, for example, may control a plurality of hardware or software elements connected to the processor 210 by driving an operating system or an application program, and perform processing of various pieces of data and calculations. The processor 210 may be embodied as, for example, a System on Chip (SoC). According to an embodiment of the present disclosure, the processor 210 may further include a Graphic Processing Unit (GPU) and/or an image signal processor. The processor 210 may include at least some (e.g., a cellular module 221) of the components illustrated in FIG. 2. The processor 210 may load, into a volatile memory, command or data received from at least one (e.g., a non-volatile memory) of the other components and may process the loaded command or data, and may store various data in a non-volatile memory.

The communication module 220 may have a configuration equal or similar to that of the communication interface 170 of FIG. 1. The communication module 220 may include, for example, a cellular module 221, a Wi-Fi module 223, a BT module 225, a GNSS module 227 (e.g., a GPS module 227, a Glonass module, a Beidou module, or a Galileo module), an NFC module 228, and a Radio Frequency (RF) module 229.

The cellular module 221, for example, may provide a voice call, a video call, a text message service, or an Internet service through a communication network. According to an embodiment of the present disclosure, the cellular module 221 may distinguish and authenticate the electronic device 201 in a communication network using the subscriber identification module 224 (e.g., the SIM card). According to an embodiment of the present disclosure, the cellular module 221 may perform at least some of the functions that the processor 210 may provide. According to an embodiment of the present disclosure, the cellular module 221 may include a communication processor (CP).

For example, each of the Wi-Fi module 223, the BT module 225, the GNSS module 227, and the NFC module 228 may include a processor for processing data transmitted/received through a corresponding module. According to an embodiment of the present disclosure, at least some (e.g., two or more) of the cellular module 221, the Wi-Fi module 223, the BT module 225, the GNSS module 227, and the NFC module 228 may be included in one Integrated Chip (IC) or IC package.

The RF module 229, for example, may transmit/receive a communication signal (e.g., an RF signal). The RF module 229 may include, for example, a transceiver, a Power Amplifier Module (PAM), a frequency filter, a Low Noise Amplifier (LNA), and an antenna. According to another embodiment of the present disclosure, at least one of the cellular module 221, the Wi-Fi module 223, the BT module 225, the GNSS module 227, and the NFC module 228 may transmit/receive an RF signal by using a separate RF module.

The subscriber identification module 224 may include, for example, a card including a subscriber identity module and/or an embedded SIM, and may contain unique identification information (e.g., an Integrated Circuit Card Identifier (ICCID)) or subscriber information (e.g., an International Mobile Subscriber Identity (IMSI)).

The memory 230 (e.g., the memory 130) may include, for example, an embedded memory 232 or an external memory 234. The embedded memory 232, for example, may include at least one of a volatile memory (e.g., a dynamic random access memory (DRAM), a static RAM (SRAM), a synchronous dynamic RAM (SDRAM), or the like), a non-volatile memory (e.g., a one-time programmable read only memory (OTPROM)), a programmable ROM (PROM), an erasable and programmable ROM (EPROM), an electrically erasable and programmable ROM (EEPROM), a mask ROM, a flash ROM, a flash memory (e.g., NAND flash, NOR flash, or the like), a hard drive, and a solid state drive (SSD).

The external memory 234 may further include a flash drive, for example, a Compact Flash (CF), a Secure Digital (SD), a Micro Secure Digital (Micro-SD), a Mini Secure Digital (Mini-SD), an eXtreme Digital (xD), a MultiMediaCard (MMC), a memory stick, or the like. The external memory 234 may be functionally and/or physically connected to the electronic device 201 through various interfaces.

The sensor module 240, for example, may measure a physical quantity or detect an operation state of the electronic device 201, and may convert the measured or detected information into an electrical signal. The sensor module 240, for example, may include at least one of a gesture sensor 240A, a gyro sensor 240B, a barometer 240C, a magnetic sensor 240D, an acceleration sensor 240E, a grip sensor 240F, a proximity sensor 240G; a color sensor 240H (e.g., a red, green, blue (RGB) sensor), a medical sensor 240I, a temperature-humidity sensor 240J, an illuminance sensor 240K, and a ultraviolet (UV) sensor 240M. Additionally or alternatively, the sensor module 240, for example, may include an olfactory sensor (E-nose sensor), an electromyography sensor (EMG) sensor, an electroencephalogram (EEG) sensor, an electrocardiogram sensor (ECG) sensor, an infrared (IR) sensor, an iris sensor (iris scan sensor) and/or a fingerprint sensor (finger scan sensor). The sensor module 240 may further include a control circuit for controlling one or more sensors included therein. According to an embodiment of the present disclosure, the electronic device 201 may further include a processor configured to control the sensor module 240, as a part of the processor 210 or separately from the processor 210, and may control the sensor module 240 while the processor 210 is in a sleep state.

The input device 250 may include, for example, a touch panel 252, a (digital) pen sensor 254, a key 256, or an ultrasonic input device 258. The touch panel 252 may use, for example, at least one of a capacitive type, a resistive type, an infrared type, and an ultrasonic type. The touch panel 252 may further include a control circuit. The touch panel 252 may further include a tactile layer, and provide a tactile reaction to the user.

The (digital) pen sensor 254 may include, for example, a recognition sheet which is a part of the touch panel or is separated from the touch panel. The key 256 may include, for example, a physical button, an optical key or a keypad. The ultrasonic input device 258 may detect, through a microphone (e.g., the microphone 288), ultrasonic waves generated by an input tool, and identify data corresponding to the detected ultrasonic waves.

The display 260 (e.g., the display 160) may include a panel 262, a hologram device 264, or a projector 266. The panel 262 may include a configuration identical or similar to the display 160 illustrated in FIG. 1. The panel 262 may be implemented to be, for example, flexible, transparent, or wearable. The panel 262 may be configured by the touch panel 252 and one module. The hologram device 264 may show a three-dimensional (3D) image in the air by using an interference of light. The projector 266 may project light onto a screen to display an image. The screen may be located, for example, in the interior of or on the exterior of the electronic device 201. According to an embodiment of the present disclosure, the display 260 may further include a control circuit for controlling the panel 262, the hologram device 264, or the projector 266.

The interface 270 may include, for example, a High-Definition Multimedia Interface (HDMI) 272, a Universal Serial Bus (USB) 274, an optical interface 276, or a D-sub-miniature (D-sub) 278. The interface 270 may be included in, for example, the communication interface 170 illustrated in FIG. 1. Additionally or alternatively, the interface 270 may include, for example, a Mobile High-definition Link (MHL) interface, a Secure Digital (SD) card/Multi-Media Card (MMC) interface, or an Infrared Data Association (IrDA) standard interface.

The audio module 280, for example, may bilaterally convert a sound and an electrical signal. At least some elements of the audio module 280 may be included in, for example, the input/output interface 150 illustrated in FIG. 1. The audio module 280 may process voice information input or output through, for example, a speaker 282, a receiver 284, earphones 286, or the microphone 288.

The camera module 291 is, for example, a device which may photograph a still image and a video. According to an embodiment of the present disclosure, the camera module 291 may include one or more image sensors (e.g., a front sensor or a back sensor), a lens, an Image Signal Processor (ISP) or a flash (e.g., LED or xenon lamp).

The power management module 295 may manage, for example, the power supply of the electronic device 201. According to an embodiment of the present disclosure, the power management module 295 may include a Power Management Integrated Circuit (PMIC), a charger Integrated Circuit (IC), or a battery or fuel gauge. The PMIC may use a wired and/or wireless charging method. Examples of the wireless charging method may include, for example, a magnetic resonance method, a magnetic induction method, an electromagnetic method, and the like. Additional circuits (e.g., a coil loop, a resonance circuit, a rectifier, etc.) for wireless charging may be further included. The battery gauge may measure, for example, a residual quantity of the battery 296, and a voltage, a current, or a temperature while charging. The battery 296 may include, for example, a rechargeable battery and/or a solar battery.

The indicator 297 may display a particular state (e.g., a booting state, a message state, a charging state, or the like) of the electronic device 201 or a part (e.g., the processor 210) of the electronic device 201. The motor 298 may convert an electrical signal into a mechanical vibration, and may generate a vibration, a haptic effect, or the like. Although not illustrated, the electronic device 201 may include a processing device (e.g., a GPU) for supporting a mobile TV. The processing device for supporting a mobile TV may process, for example, media data according to a certain standard such as Digital Multimedia Broadcasting (DMB), Digital Video Broadcasting (DVB), or mediaFLO™.

Each of the above-described component elements of hardware according to the present disclosure may be configured with one or more components, and the names of the corresponding component elements may vary based on the type of electronic device. In various embodiments, the electronic device may include at least one of the above-described elements. Some of the above-described elements may be omitted from the electronic device, or the electronic device may further include additional elements. Also, some of the hardware components according to various embodiments may be combined into one entity, which may perform functions identical to those of the relevant components before the combination.

Figure 3:
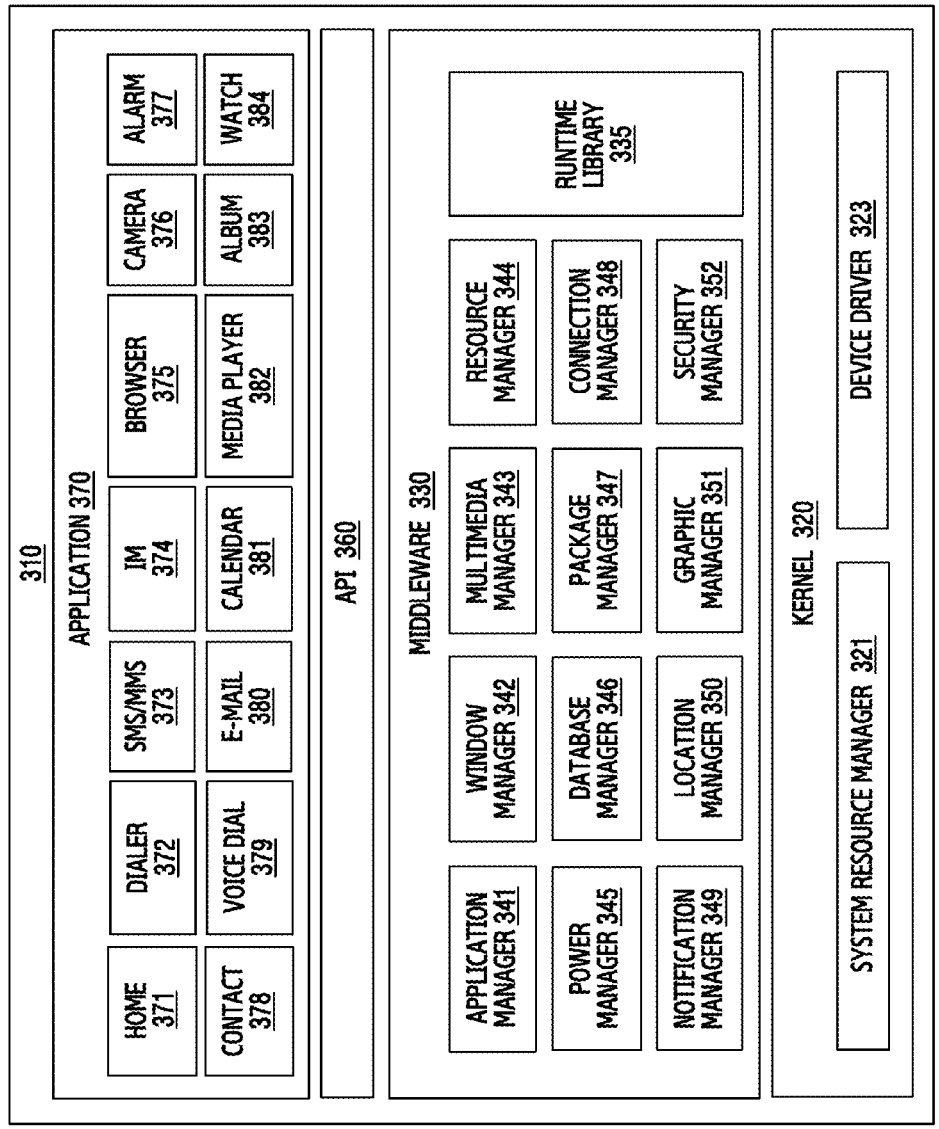
FIG. 3 is a block diagram of an example of a program module, according to various embodiments of the present disclosure.

FIG. 3 is a block diagram of an example of a program module, according to various embodiments of the present disclosure.

According to an embodiment of the present disclosure, the program module 310 (e.g., the program 140) may include an Operating System (OS) for controlling resources related to the electronic device (e.g., the electronic device 101) and/or various applications (e.g., the application programs 147) executed in the operating system. The operating system may be, for example, Android, iOS, Windows, Symbian, Tizen, Bada, or the like.

The program module 310 may include a kernel 320, middleware 330, an API 360, and/or applications 370. At least some of the program module 310 may be preloaded on an electronic device, or may be downloaded from an external electronic device (e.g., the electronic device 102 or 104, or the server 106).

The kernel 320 (e.g., the kernel 141) may include, for example, a system resource manager 321 and/or a device driver 323. The system resource manager 321 may control, allocate, or collect system resources. According to an embodiment of the present disclosure, the system resource manager 321 may include a process management unit, a memory management unit, a file system management unit, and the like. The device driver 323 may include, for example, a display driver, a camera driver, a Bluetooth driver, a shared memory driver, a USB driver, a keypad driver, a Wi-Fi driver, an audio driver, or an Inter-Process Communication (IPC) driver.

For example, the middleware 330 may provide a function required in common by the applications 370, or may provide various functions to the applications 370 through the API 360 so as to enable the applications 370 to efficiently use the limited system resources in the electronic device. According to an embodiment of the present disclosure, the middleware 330 (e.g., the middleware 143) may include at least one of a run time library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, and a security manager 352.

The runtime library 335 may include a library module that a compiler uses in order to add a new function through a programming language while an application 370 is being executed. The runtime library 335 may perform input/output management, memory management, the functionality for an arithmetic function, or the like.

The application manager 341 may manage, for example, a life cycle of at least one of the applications 370. The window manager 342 can manage Graphical User Interface (GUI) resources used by a screen. The multimedia manager 343 may recognize a format required for reproduction of various media files, and may perform encoding or decoding of a media file by using a codec suitable for the corresponding format. The resource manager 344 can manage resources such as a source code, a memory, and a storage space of at least one of the applications 370.

The power manager 345 may operate together with, for example, a Basic Input/Output System (BIOS) or the like to manage a battery or power source and may provide power information or the like required for the operations of the electronic device. The database manager 346 may generate, search for, and/or change a database to be used by at least one of the applications 370. The package manager 347 can manage installation or an update of an application distributed in a form of a package file.

For example, the connectivity manager 348 can manage wireless connectivity such as Wi-Fi or Bluetooth. The notification manager 349 can display or notify of an event such as an arrival message, an appointment, a proximity notification, and the like in such a way that does not disturb a user. The location manager 350 may manage location information of an electronic device. The graphic manager 351 can manage a graphic effect which will be provided to a user, or a user interface related to the graphic effect. The security manager 352 can provide all security functions required for system security or user authentication. According to an embodiment of the present disclosure, when the electronic device (e.g., the electronic device 101) has a telephone call function, the middleware 330 may further include a telephony manager for managing a voice call function or a video call function of the electronic device.

The middleware 330 may include a middleware module that forms a combination of various functions of the above-described components. The middleware 330 may provide a module specialized for each type of OS in order to provide a differentiated function. Further, the middleware 330 may dynamically remove some of the existing elements or add new elements.

The API 360 (e.g., the API 145) is, for example, a set of API programming functions, and may be provided with a different configuration according to an OS. For example, in the case of Android or iOS, one API set may be provided for each platform. In the case of Tizen, two or more API sets may be provided for each platform.

The applications 370 (e.g., the application programs 147) may include, for example, one or more applications which may provide functions such as a home 371, a dialer 372, an SMS/MMS 373, an Instant Message (IM) 374, a browser 375, a camera 376, an alarm 377, contacts 378, a voice dialer 379, an email 380, a calendar 381, a media player 382, an album 383, a clock 384, health care (e.g., measuring exercise quantity or blood sugar), or environment information (e.g., providing atmospheric pressure, humidity, or temperature information).

According to an embodiment of the present disclosure, the applications 370 may include an application (hereinafter, referred to as an "information exchange application" for convenience of description) that supports exchanging information between the electronic device (e.g., the electronic device 101) and an external electronic device (e.g., the electronic device 102 or 104). The information exchange application may include, for example, a notification relay application for transferring specific information to an external electronic device or a device management application for managing an external electronic device.

For example, the notification relay application may include a function of transferring, to the external electronic device (e.g., the electronic device 102 or 104), notification information generated from other applications of the electronic device 101 (e.g., an SMS/MMS application, an e-mail application, a health management application, or an environmental information application). Further, the notification relay application may receive notification information from, for example, an external electronic device and provide the received notification information to a user.

For example, the device management application may manage (e.g., install, delete, or update) at least one function of an external electronic device (e.g., the electronic device 104) communicating with the electronic device (e.g., a function of turning on/off the external electronic device itself (or some components) or a function of adjusting luminance (or a resolution) of the display), applications operating in the external electronic device, or services provided by the external electronic device (e.g., a call service and a message service).

According to an embodiment of the present disclosure, the applications 370 may include applications (e.g., a health care application of a mobile medical appliance or the like) designated according to an external electronic device (e.g., attributes of the electronic device 102 or 104). According to an embodiment of the present disclosure, the applications 370 may include an application received from an external electronic device (e.g., the server 106, or the electronic device 102 or 104). According to an embodiment of the present disclosure, the applications 370 may include a preloaded application or a third party application that may be downloaded from a server. The names of the components of the program module 310 of the illustrated embodiment of the present disclosure may change according to the type of operating system.

According to various embodiments, at least a part of the programming module 310 may be implemented in software, firmware, hardware, or a combination of two or more thereof. At least some of the program module 310 may be implemented (e.g., executed) by, for example, the processor (e.g., the processor 210). At least some of the program module 310 may include, for example, a module, a program, a routine, a set of instructions, and/or a process for performing one or more functions.

The term "module" as used herein may, for example, mean a unit including one of hardware, software, and firmware or a combination of two or more of them. The "module" may be interchangeably used with, for example, the term "unit", "logic", "logical block", "component", or "circuit". The "module" may be a minimum unit of an integrated component element or a part thereof. The "module" may be a minimum unit for performing one or more functions or a part thereof. The "module" may be mechanically or electronically implemented. For example, the "module" according to the present disclosure may include at least one of an Application-Specific Integrated Circuit (ASIC) chip, a Field-Programmable Gate Arrays (FPGA), and a programmable-logic device for performing one or more operations.

According to various embodiments, at least some of the devices (e.g., modules or functions thereof) or the method (e.g., operations) according to the present disclosure may be implemented by a command stored in a computer-readable storage medium in a programming module form. The instruction, when executed by a processor (e.g., the processor 120), may cause the one or more processors to execute the function corresponding to the instruction. The computer-readable recording media may be, for example, the memory 130.

The computer readable recording medium may include a hard disk, a floppy disk, magnetic media (e.g., a magnetic tape), optical media (e.g., a Compact Disc Read Only Memory (CD-ROM) and a Digital Versatile Disc (DVD)), magneto-optical media (e.g., a floptical disk), a hardware device (e.g., a Read Only Memory (ROM), a Random Access Memory (RAM), a flash memory), and the like. In addition, the program instructions may include high-class language codes, which can be executed by a computer by using an interpreter, as well as machine codes made by a compiler. The aforementioned hardware device may be configured to operate as one or more software modules in order to perform the operation of the present disclosure, and vice versa.

Any of the modules or programming modules according to various embodiments of the present disclosure may include at least one of the above-described elements, exclude some of the elements, or further include other additional elements. The operations performed by the modules, programming module, or other elements according to various embodiments of the present disclosure may be executed in a sequential, parallel, repetitive, or heuristic manner. Further, some operations may be executed according to another order or may be omitted, or other operations may be added. Various embodiments disclosed herein are provided merely to easily describe technical details of the present disclosure and to help the understanding of the present disclosure and are not intended to limit the scope of the present disclosure. Therefore, it should be construed that all modifications and changes or modified and changed forms based on the technical idea of the present disclosure fall within the scope of the present disclosure.

A variety of suggested embodiments of the present disclosure relate to an electronic device having a camera function and an operation method thereof. According to various embodiments of the present disclosure, an electronic device may analyze subjects in a designated focus detection area (default focusing area) and correct a focus detection area in order to accurately focus on a target subject according to a result obtained from the analysis. In this case, the subject in the focus detection area may be a fixed subject or a moving subject.

First, an electronic device according to various embodiments of the present disclosure may have a camera, display a preview image in a focus detection mode, display a designated focus detection area in the displayed preview image screen, group areas having a high similarity after analyzing image properties of subjects in the designated focus detection area, and correct a focus detection area around the grouped area. Hereinafter, the electronic device may automatically detect the focus of a subject in a corrected focus detection area so as to acquire a subject image accurately focused thereon.

Second, an electronic device according to various embodiments of the present disclosure may have a camera and automatically perform a focus detection by tracking a moving subject. To this end, the electronic device can: perform a high pixel image-based subject tracking and a low pixel-based subject tracking when a subject moves in a designated focus detection area; and, after comparing result locations of the high pixel and low pixel-based tracking, if difference in the locations is above a predetermined value, correct a focus detection area based on two locations.

In the following description, the wording "property" may be used as a wording including a part or all of depth, brightness, color, luminance, form, etc., of images in a focus detection area. In addition, the wording "depth" may be used as a word including a part or all of information on distance, interval, or phase-difference between images located in a focus detection area in an acquired image. The wording "a designated focus detection area (default focusing area)" may be a focus detection area which is configured for the first time, and the designated focus detection area may be configured by selecting a center focus detection mode or a face recognition focus detection mode in a menu and be configured at the location selected by a user touch input in a camera photography mode. "A corrected focus detection area" may be a focus detection area in which an area of a designated focus detection area is corrected. The corrected focus detection area may be a focus detection area reconfigured by grouping areas having a high similarity of image properties after analyzing image properties of subjects in a designated focus detection area. The wording "a first focus" may mean a focus in a designated focus detection area. For example, the first focus mode may be a center focus mode, a multiple focus mode and the like. The wording "a first focus state" may mean a state of acquiring and displaying an image using the first focus. The wording "a second focus" may mean a focus in a focus detection area which is corrected during photographing. For example, the second focus mode may mean a mode for analyzing a property of a configured subject, correcting a focus detection area according to the result obtained from the analysis, and detecting a focus. The wording "a second focus state" may mean a state of acquiring and displaying an image by focusing (a second focusing) on a subject in a corrected focus detection area.

In various embodiments of the present disclosure, the wearable device and the device may be included in a category of an electronic device, and an operation interworking among electronic devices may operate in a variety of electronic devices as well as the wearable device and the device. For example, like an information communication device, a multimedia device, a wearable device, and an applied device of the electronic device, which all support a function according to various embodiments of the present disclosure, an electronic device in various embodiments of the present disclosure may include all devices using at least one of a variety of processors (e.g., processors 120, 210) including an application processor (AP), a communication processor (CP), a Graphic Processing Unit (GPU), and a Central Processing Unit (CPU).

Hereinafter, various embodiments of the present disclosure will be described from the perspective of hardware. However, various embodiments of the present disclosure include a technology that uses both hardware and software and thus, the various embodiments of the present disclosure may not exclude the perspective of software.

Figure 4:
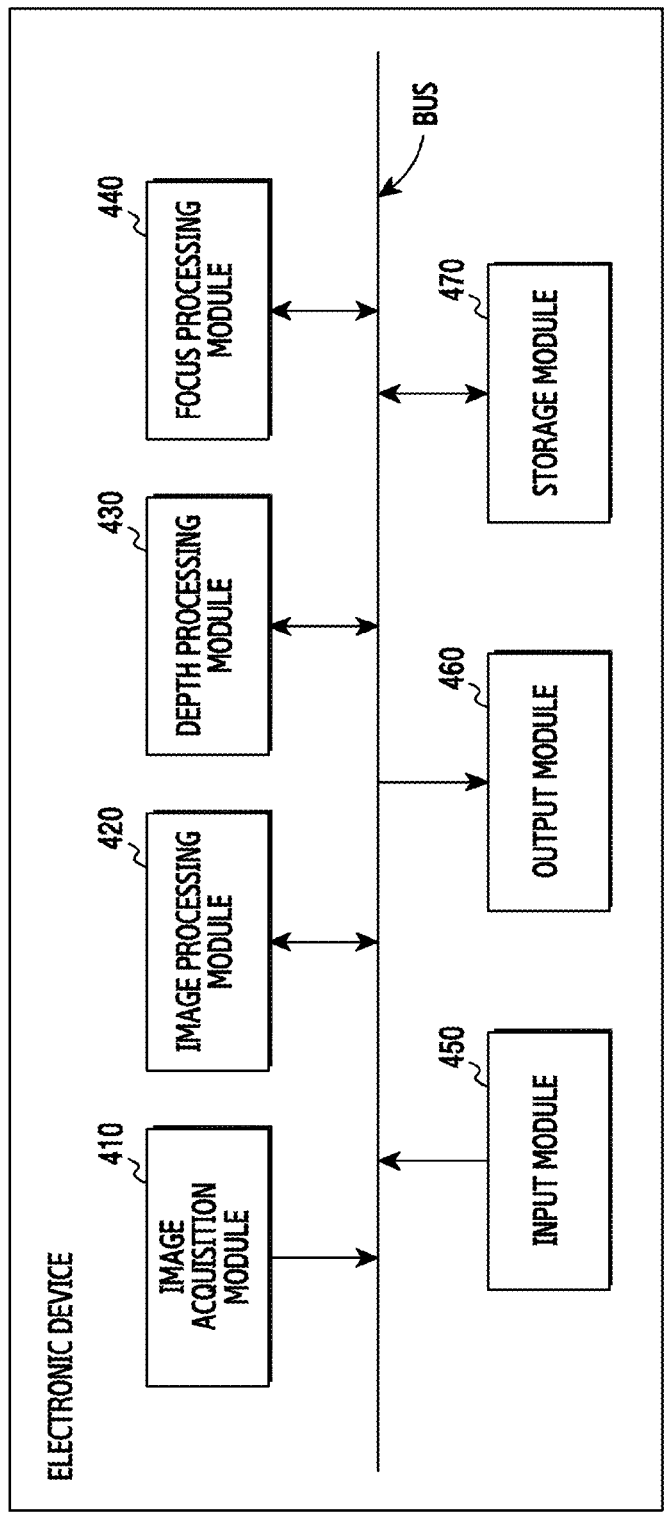
FIG. 4 is a block diagram of an example of an electronic device, according to various embodiments of the present disclosure.

FIG. 4 is a diagram of an example of an electronic device, according to various embodiments of the present disclosure. FIG. 4 may include an image acquisition module 410, an image processing module 420, a depth processing module 430, a focus processing module 440, an input module 450, an output module 460, and a storage module 470.

According to aspects of the disclosure, the image acquisition module 410 may include a camera module. In addition, the camera module may include an optical unit, an actuator that actuates the optical unit, an image sensor that generates an image by sensing light through the optical unit, and the like. The input module 450 may include a touch panel. The image acquisition module 410 and the input module 450 may be included in the input interface 150 of FIG. 1. According to aspects of the disclosure, the image processing module 420, the depth processing module 430, and the focus processing module 440 may be included the processor 120 of FIG. 1. Additionally or alternatively, the image processing module 420, the depth processing module 430, and the focus processing module 440 may be integrated into one device (image signal processor (ISP)). The output module 460 may be the display 160 of FIG. 1 and the storage module 470 may be the memory 130 of FIG. 1.

The image acquisition module 410, which is a device converting light into an electric signal, may acquire an image by dividing light into separate electric signals depending on wavelength (e.g., color), route (e.g., incidence angle), and the like. The image acquisition module 410 may include an image sensor through which an external image is sensed, and convert and output the external image into an electric signal and digital data. The image sensor may include at least one of color pixel sensors (or color pixels or image pixels) and at least one of upper side phase-difference detection sensors (or phase-difference detection pixels). The color pixel sensors may include at least one of red, green, and blue pixels. The color pixel sensor may acquire images of a subject. In addition, the upper side phase-difference detection sensor may be arranged and distributed in at least one part of the entire area of the image sensor. The upper side phase-difference detection sensor may acquire phase-difference information according to a relative distance between subjects included in a photographed image. The image acquisition module 410 may acquire color image data through color pixel sensors, and/or a phase-difference signal which indicates the depth associated with different subjects.

The input module 450 may be a device (e.g., a touch screen) which generates or transmits, to a terminal, a particular input signal. For example, the input module 450 may perform a role as an interface capable of transmitting, to the other element(s) of an electronic device, a command or data input by a user or the other external device. The display 450 may include a touch screen, and may receive, for example, a touch, gesture, proximity, or hovering input using an electronic pen or a user's body part.

The image processing module 420 may perform a function for processing an image acquired by the image acquisition module 410. For example, the image processing function may be an error correction function (e.g., a function for correcting a bad pixel, lens shading, chromatic aberration, noise and the like) and an intensity correction (correcting white balance and gamma), color histogram detection, outline detection, similar image signal detection, image signal tracking, etc., of a signal transmitted by the image acquisition module 410.

The output module 460 may be a device (display 160 of FIG. 1) which displays a location of input (e.g., touch) generated by the input module 450, an image output by the image acquisition module 410 or the image processing module 420, and an image or information processed by the depth processing module 430 or the focus processing module 440. The output module 460 may include any suitable type of output device, such as a wired or wireless communication interface or a speaker. In operation, the output module 460 may output a command or data received from other element(s) of the electronic device to a user (e.g., and/or transmit the command or data to an external device.

Examples of the display may include a Liquid Crystal Display (LCD), a Light-Emitting Diode (LED) display, an Organic Light-Emitting Diode (OLED) display, a MicroElectroMechanical Systems (MEMS) display, and an electronic paper display. The display, for example, may display various types of contents (e.g., text, images, videos, icons, or symbols) for presentation to the user.

The depth processing module 430 may calculate and process a three-dimensional location of subjects in an image by analyzing depth information (e.g., phase-difference information) provided by the image acquisition module 410. The depth processing module 430 may be a device which extracts information relating to a distance between a terminal and a subject or a surface shape of a subject through calculation on the basis of a signal output from an image sensor of the image acquisition module 410 or a device capable of acquiring depth information.

The focus processing module 440 may be a device which adjusts a focus of the image acquisition module 410 based on at least one of the image processing module 420, the depth processing module 430, and the image acquisition module 410. The focus processing module 440 may analyze property information of a subject located in a default focus detection area, and perform a focus process (processing in a first focus state). Further, the focus processing module 440 may focus on subjects in a corrected focus detection area (processing in a second focus state) by controlling the image acquisition module 410 after reconfiguring the focus detection area to include an area in which a main subject (target subject) is located. The property (attribute) information includes at least one of a depth between subjects, brightness, color, and shape. In operation, the focus processing module 440 may identify similarities between the respective attributes of different subjects, identify at least one group of subjects that have similar attributes, and configure the focus detection area to include the group of subjects. According to aspects of the disclosure, a first attribute of a first subject may be deemed similar to a second attribute of a second subject when the focus processing module detects that the first attribute satisfies a matching criterion with respect to the second attribute.

The storage module 470 may be a device which stores a part of information transmitted through a communication channel (e.g., an image processed by the image processing module 420). A bus may include a circuit by which module elements are connected with each other and which transmits a communication (e.g., a control message and/or data) among elements.

Figure 5A:
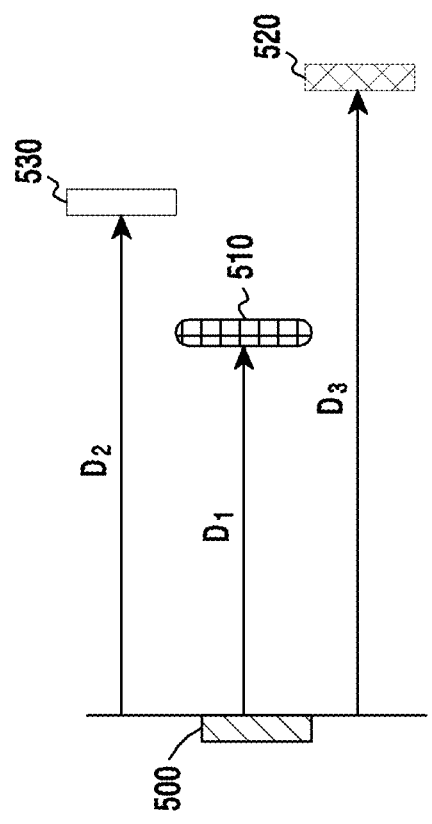
FIG. 5A is a diagram of an example of different subject locations, according to various embodiments of the present disclosure.
Figure 5A:
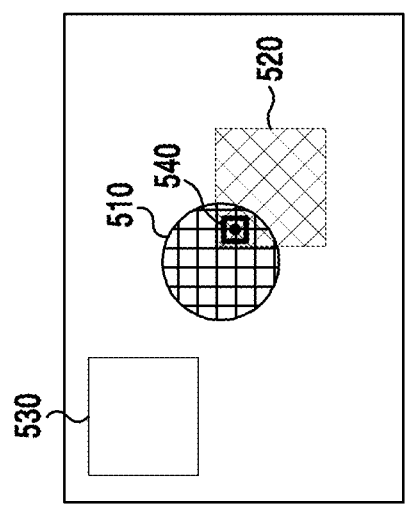
Figure 5B:
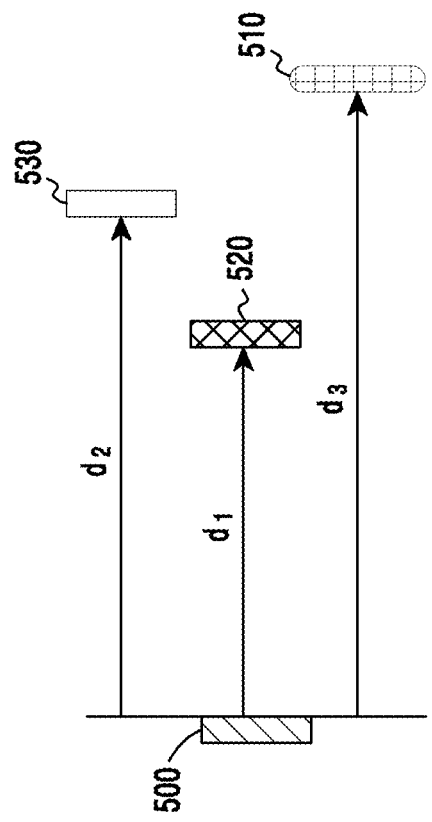
FIG. 5B is a diagram of an example of different subject locations, according to various embodiments of the present disclosure.
Figure 5B:
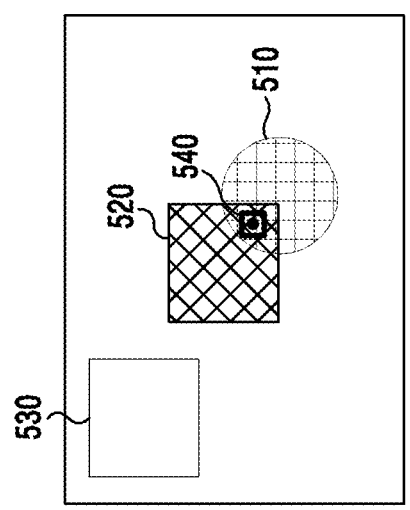
Figure 5C:
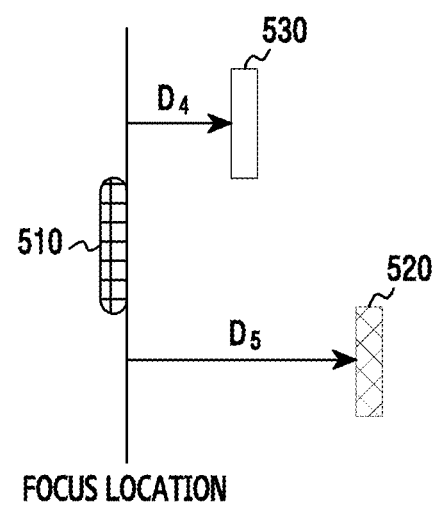
FIG. 5C is a diagram of an example of different subject locations, according to various embodiments of the present disclosure.

FIG. 5A to FIG. 5C are diagrams illustrating an example of different subject locations, according to various embodiments of the present disclosure.

When subjects 510-530 are arranged in the front of an electronic device, as illustrated in FIG. 5A to FIG. 5C, a user may focus on and photograph a desired subject. In FIG. 5A, the subject 510 is located nearest to an electronic device such that the subject 510 is separated from the location of the electronic device by distance (or depth) D1, the subject 520 is located furthest from the electronic device such that the subject 520 is separated from the electronic device by distance (or depth) D3, and parts of the subjects 510 and 520 are located together in the focus detection area 540. In addition, in FIG. 5B, the subject 520 is located nearest to an electronic device such that the subject 520 is separated from the electronic device by distance (or depth) D1, the subject 510 is located furthest to the electronic device and the subject 510 is separated from the electronic device by distance (or depth) D3, and parts of the subjects 510 and 520 are located together in the focus detection area 540. Further, when the subject 510 is focused on as illustrated in FIG. 5C, a part of subject 520 which is separated from the subject 510 by distance (depth) D5 may also be located in the focus detection area 540. In instances in which subjects having different depths exist in a designated focus detection area or target subjects are not properly located in a focus detection area, an electronic device may cause an AF failure.

An AF failure in which a target subject may not be properly focused on may occur when the following conditions are met.

For example, an AF failure may occur when a target subject is not properly located in an AF area. For example, when an AF area is configured to be in the center of a screen, if a target subject is located slightly astray from the center AF area of the screen or much of a surrounding (background) area is included in the AF area, an AF failure may occur. Also, in a case of a face recognition AF mode, if the size of a face to be recognized is small (or dark relative to other subjects), an AF failure may occur as a result of insufficient acquisition of calculation data required for performing an AF.

As another example, an AF failure may occur when there is much noise in AF data because the brightness of an image in an AF area is saturated or too dark. The electronic device cannot properly distinguish the shape of a subject in such an environment. For example, since the electronic device performs AF by using the shape of a subject or the level of clarity of a pattern, the electronic device may have difficulty performing an accurate AF when the brightness of a target subject is dark or saturated.

As yet another example, an AF failure may occur when a time delay by a tracking processing occurs in a tracking AF operation. When detecting a focus based on a result obtained from an image tracking process, an electronic device may perform focus detection with respect to an erroneous area if a subject moves while performing a tracking.

An electronic device according to various embodiments of the present disclosure may analyze information on subjects located in a focus detection area (e.g., depth information, color histogram information, and the like) and detect a focus on a subject located in an area of interest (region of interest).

The electronic device may calculate depth information of subjects located in a focus detection area by using a phase-difference detection pixel arranged in the image sensor of the image acquisition module 410. For example, the electronic device may acquire depth information of subjects located in a focus detection area using a phase-difference detection pixel of an image sensor. The electronic device may analyze the acquired depth information, move a focus detection area to an area in which a subject having a high similarity is located, and configure the moved area as a corrected focus detection area. In addition, the electronic device may focus on a subject in the corrected focus detection area by controlling the image acquisition module 410, and receive and process an image of the subject that is acquired by the image acquisition module 410.

Figure 6A:
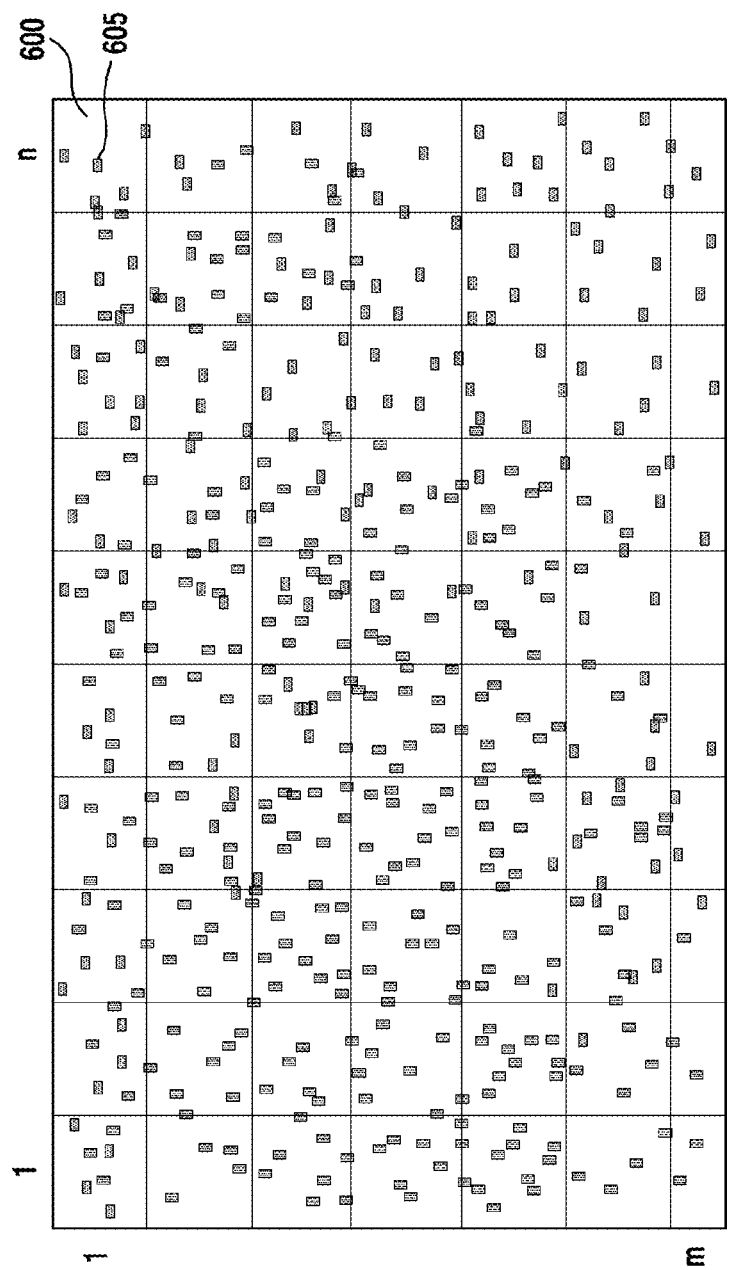
FIG. 6A is a diagram of an example of an image sensor, according to various embodiments of the present disclosure.

FIG. 6A is a diagram of an example of an image sensor, according to various embodiments of the present disclosure. In some implementations, the image sensor may be part of an image acquisition module.

Referring to FIG. 6A, an image sensor may include at least one of phase-difference detection pixels 605 (e.g., the upper side phase-difference detection sensors) and at least one of image pixels 600 (e.g., the color pixels). The image sensor may acquire an image of a subject by processing a signal detected from image pixels 600. In addition, an electronic device may acquire relative distance (depth) information of subjects (e.g., subjects 510-530 in FIG. 5A to FIG. 5C) based on a phase-difference value sensed by phase-difference detection pixels 605 of the image sensor. For example, in the example of FIG. 5A, the electronic device may acquire a distance to a subject based on a value of phase-difference detection pixels included in an image. The electronic device may divide the entire area of an image sensor into multiple subareas (M×N), and acquire a distance between subjects detected in each subarea based on a value of phase-difference detection pixels included in each of the subareas. For example, an electronic device may acquire depth information of subjects located in a designated focus detection area using phase-difference detection pixels of subareas located in the designated focus detection area, analyze the acquired depth information, and configure the focus detection area by moving it to a subarea in which a main subject is located.

Figure 6B:
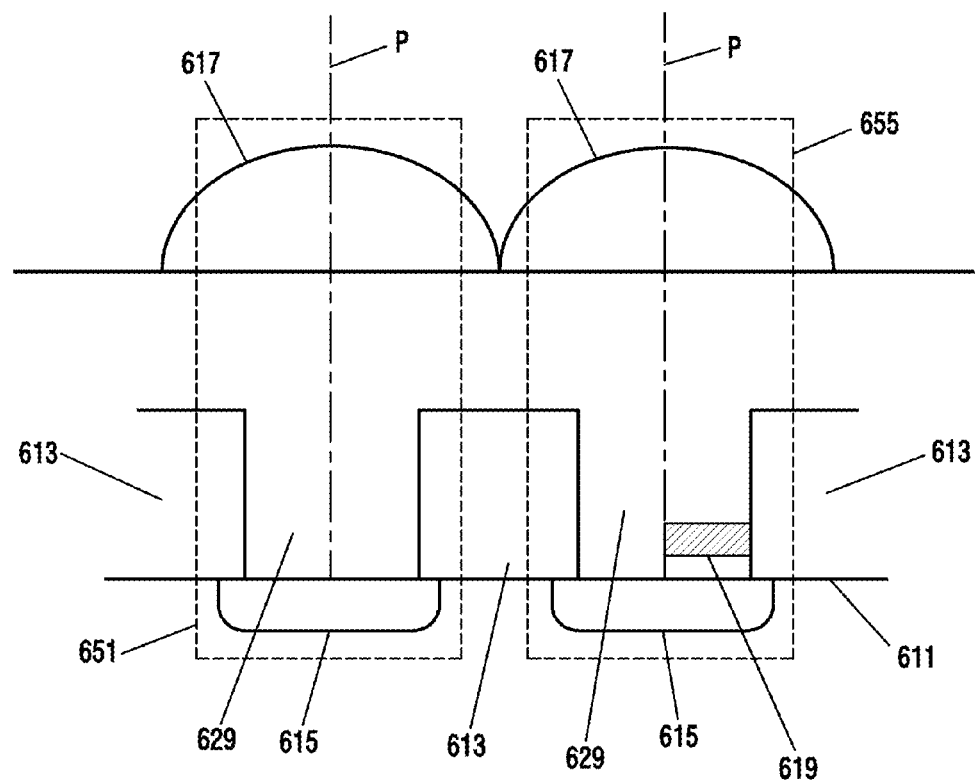
FIG. 6B is a diagram of a portion of the image sensor of FIG. 6A, according to various embodiments of the present disclosure.
Figure 6C:
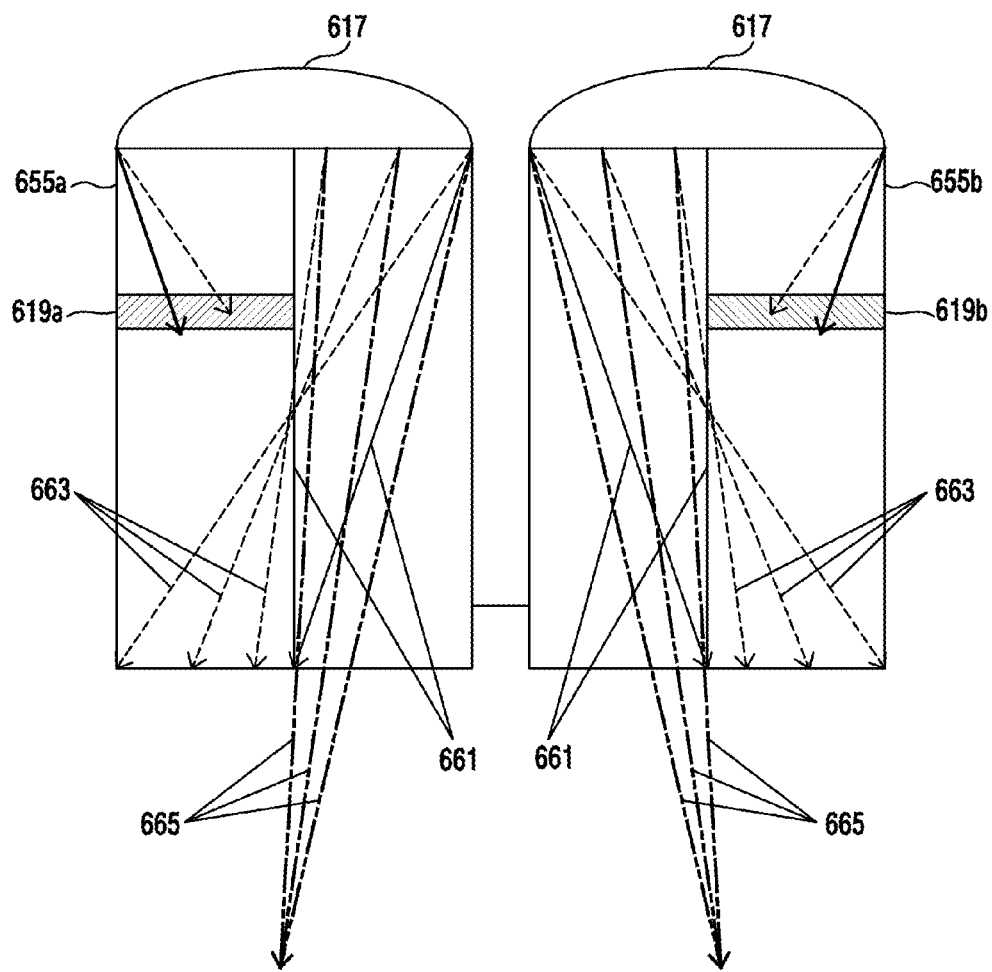
FIG. 6C is a diagram of a portion of the image sensor of FIG. 6A, according to various embodiments of the present disclosure.

FIGS. 6B and 6C illustrate a part, which is enlarged, of an image sensor, according to one of various embodiments of the present disclosure.

Referring to FIG. 6B, pixels 651 and 655 constituting an image sensor (e.g., an image sensor included in the image acquisition module 410) may have wiring areas 613, light receiving areas 615, and imaging lenses (e.g., micro lenses 617).

The wiring areas 613 may be arranged on one side of a substrate 611 of the image sensor at a regular interval and have the light receiving areas 615 arranged between the wiring areas 613, respectively. For example, the wiring areas 613 and the light receiving areas 615 may be alternately arranged on one side of the substrate 611. Elements such as a power supply or a signal line and a transistor may be arranged in the wiring areas 613. The light receiving area 615 may be a photoelectric conversion area in which light and an image are substantially detected and converted into an electric signal that may be subsequently transmitted to the wiring areas 613.

Each of unit pixels 651 and 655 may include wiring and a transistor of one light receiving area 615, a wiring area 613 connected thereto, and a micro lens 617 correspondingly arranged in a corresponding light receiving area 615. Any of unit pixels 651 and 655 may operate as an image detection pixel (e.g., a color pixel), and some of the pixels (e.g., 655), for example, may be phase-difference focus detection pixels having a phase separation structure.

The phase-difference detection pixel 655 may include a phase separation structure having a light shielding film 619 installed in the light receiving area 615. Each micro lens 617 may be arranged in a state which a corresponding light receiving area 615 and optical axis (P) are consistent with each other. An empty space (cavity) 629 may be formed between the upper side of the light receiving area 615 and the wiring areas 613, wherein the light shielding film 619 may be arranged in the empty space 629 among the wiring areas 613. The light shielding film 619 may block a part, e.g., approximately half, of the surface area of the light receiving area 615 on one side of the light receiving area 615 so as to block a part of light entering into the light receiving area 615.

Referring to FIG. 6C, the phase-difference focus detection pixels 655 may be arranged in pairs close to or partially spaced from each other like reference numerals 655A and 655B in FIG. 6. Among the pair of phase-difference focus detection pixels 655, a light shielding film 619A arranged in a first phase-difference detection pixel 655A may be arranged in, for example, an offset location which is not overlapped with respect to a light shielding film 619B arranged in a second phase-difference detection pixel 655B. When the first phase-difference detection pixel 655A detects light passing through one side of a micro lens 617, the second phase-difference detection pixel 655B may detect light passing through the other side of the micro lens 617. The image sensor or an electronic device such as a camera or a portable terminal having an image sensor may compare values detected from each of the phase-difference detection pixels 655 and detect a focus control state of the image sensor.

According to an embodiment, the phase-difference detection pixel may output a different value according to a first focus state (e.g., a solid line 661) corresponding to which a focus on a subject is located in an image sensor 125, a second focus state (e.g., a dotted line 663) corresponding to which a focus on a subject is located between an image sensor 600 and the subject, and a third focus state (e.g., two-dot-chain lines 665) corresponding to which a focus on the subject is located in an area other than the image sensor 600 and the area between the image sensor 600 and the subject. An electronic device may identify a relative distance between subjects on the basis of the first to third focus states.

FIG. 6B and FIG. 6C illustrate a phase-difference detection pixel having, for example, a light shield film in order to describe a phase-difference detection pixel structure and operation. However, a phase-difference detection pixel according to various embodiments may include a phase-difference detection pixel having various forms (or structures) of phase-difference separation structures.

As described above, when shooting an image using an image acquisition module, at least one subject may be located in a focus detection area, and distance (or depth) information between the subject and other subjects may be extracted using a phase-difference detection pixel (e.g., upper side phase-difference detection sensor) 510 arranged in an image sensor. In such instances, the electronic device (e.g., by using the depth processing module 430) may obtain a phase-difference value of each of the phase-difference detection pixels (or upper side phase-difference detection sensors) in pairs, divide an area of the image sensor into subareas, as illustrated in FIG. 6, and obtain a phase-difference value using phase-difference detection pixels (or upper side phase-difference detection sensors) corresponding to subareas, respectively.

Hereinafter, an example of a method is provided for calculating distance information associated with a particular subject by using phase-difference detection pixels corresponding subareas, respectively, as illustrated in FIG. 6A. According to this example, the focus detection area may include two or more subjects, and the depth processing module 430 may obtain a distance (or depth) between a focused subject and one or more subjects that are out of focus (e.g., subjects having a front focus and a back focus) by calculating a distance (or depth) of such subjects.

The image acquisition module 410 of the electronic device according to various embodiments of the present disclosure may include an image sensor having phase-difference detection pixels and color pixels. The depth processing module 430 may calculate relative distance (depth) information of subjects located in a focus detection area based on a phase-difference value detected by the phase-difference detection pixels of the image acquisition module 410. Further, an image processing module 420 may identify locations of subjects in a focus detection area based on image signals received from the color pixels of the image acquisition module 410. Then, a focus processing module 440 may move the focus detection area to an area in which a main target subject is located on the basis of information on depths of subjects in the focus detection area output by the depth processing module 430 and information on locations of subjects processed in the image processing module 420. Further, the focus processing module 440 may reconfigure the corrected focus detection area in the image acquisition module 410. Then, the image acquisition module 410 may acquire an image by focusing (e.g., auto focusing) on a subject in the reconfigured focus detection area (corrected focus detection area).

In addition, the image processing module 420 may analyze image properties of subjects located in the focus detection area. By way of example, the image properties may include one or more of brightness, color, luminescence, shape, etc., of a subject. The image processing module 420 may transmit, to the focus processing module 440, location information of the subject and image property information in the focus detection area. Then, the focus processing module 440 may determine a corrected focus detection area reconfiguring the focus detection area to cover the area in which a main target subject is located using location information associated with the subject and image property information in the focus detection area.

The focus detection module 440 may use the location information of a subject output by the image processing module 420 and depth information of a subject output by the depth processing module 430 as a basis for identifying a corrected focus detection area. Additionally or alternatively, the focus detection module 440 may use location information of the subject and image property information output by the image processing module 420 as a basis for identifying a corrected focus detection area. Further, the focus detection module 440 may analyze location information of the subject output by the image processing module 420, depth information of the subject output by the depth processing module 430, and the image property information output by the image processing module 420, and configure a corrected focus detection area. Further, the focus detection module 440 may configure a corrected focus detection area by moving and/or changing the size of a designated focus detection area.

Figure 7:
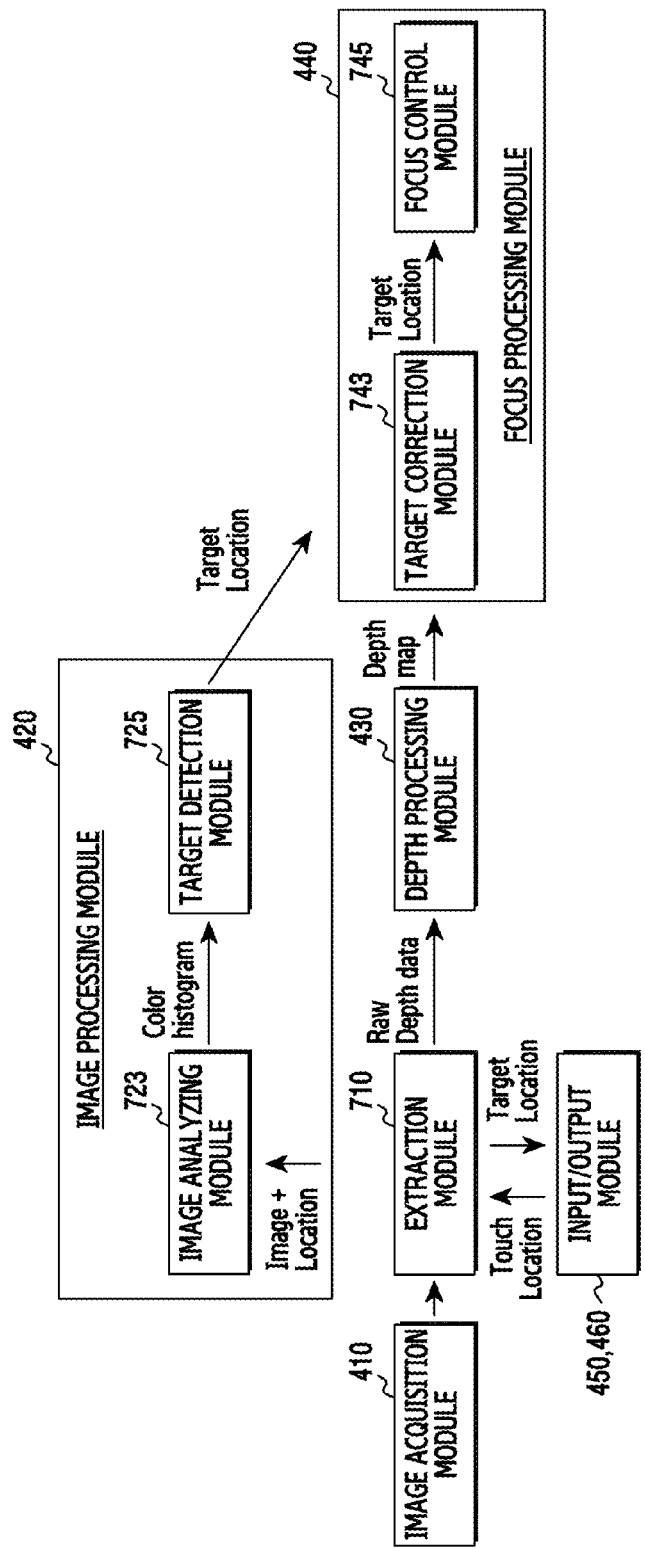
FIG. 7 is a diagram of an example of an electronic device, according to various embodiments of the present disclosure.

FIG. 7 is a diagram of an example of an electronic device, according to various embodiments of the present disclosure. An electronic device according to various embodiments of FIG. 7 of the present disclosure may include an image acquisition module 410, an extraction module 710, an image processing module 420, a depth processing module 430, a focus processing module 440, an input module 450, an output module 460, and a storage module 470. For example, the extraction module 710 may be a module which extracts an image and depth information from an output of the image acquisition module 410. In FIG. 7, the image processing module 420 may include an image analyzing module 723 and a target detection module 725. In addition, a focus processing module 440 may include a target correction module 743 and a focus control module 745.

The image acquisition module 410 may include a camera module. The camera module may have an image sensor including color pixels and phase-difference detection pixels. The image acquisition module 410 may generate image data of subjects, phase-difference information according to a relative distance, and the like.

The input module 450 may be a touch panel, and the output module 460 may be a display. Therefore, the input/output modules 450 and 460 may be a touch screen in which a touch panel and a display are integrally configured. If a particular location is selected through the input module 450 during the display of a preview image, the electronic device may configure a focus detection area based on the touched location. Further, the electronic device may display the focus detection area on the output module 460.

The extraction module 710 may extract each of image data and a phase-difference signal output by using the image acquisition module 410. In some implementations, the extraction module 710 may be included in each of the image processing module 420 and a depth processing module 430, as described above. Additionally or alternatively, in some implementations, the image processing module 420 may perform at least some of the functions of the extraction module 710.

The image processing module 420 may have an image analyzing module 723 and a target detection module 725. The image analyzing module 723 may analyze image data output by the extraction module 710 and calculate a color histogram which is an image property of subjects. The target detection module 725 may analyze the color histogram and detect the locations of subjects (target locations) existing in a focus detection area.

In addition, the image processing module 420 may perform one or more types of corrections on an image acquired by the image acquisition module 410. For example, the corrections may include an error correction (correcting a bad pixel, lens shading, chromatic aberration, noise and the like) and an intensity correction (correcting white balance and gamma). Additionally or alternatively, the image processing module 420 may perform various types of image processing functions, such as color histogram detection, outline detection, similar image signal detection, image signal tracking, etc., of a signal transmitted by the image acquisition module 410. Further, the image processing module 420 may analyze an image of subjects located in a focus detection area and output image property information (information on at least one property of brightness, color, luminescence, shape, etc., of an image).

The depth processing module 430 may analyze depth information (e.g., the phase-difference information) output by the extraction module 710, and calculate three-dimensional location information of subjects based on the analyzed depth information. The depth processing module 430 may be a device which extracts information relating to a distance between the electronic device and a subject or a surface shape of a subject on the basis of a signal output from an image sensor of the image acquisition module 410 or a device capable of acquiring depth information.

The focus processing module 440 may include a target correction module 743 and a focus control module 745. The target correction module 743 may analyze location information on a main target subject of the image processing module 420 and relative distance information (depth information) between subjects of the depth processing module 430, and correct the location of the main target subject. The focus control module 745 may move (or resize) a focus detection area in order to include the corrected main target subject.

The focus processing module 440 may adjust a focus of the image acquisition module 410 based on a signal that is output by at least one of the image processing module 420, the depth processing module 430, and the image acquisition module 410. The focus processing module 440 may analyze property information of a subject located in a designated focus detection area which is primarily configured, and move the focus detection area to a position in which a main subject (target subject) is located according to the result obtained from the analysis. The property information for configuring the corrected focus detection area includes at least one of a depth between subjects, brightness, color, and shape. In operation, the focus processing module 440 may analyze a similarity of property information, perform a grouping for groups having a high similarity, and configure the corrected focus detection area.

A method for configuring a corrected focus detection area in the focus processing module 440 is described.

According to the process, the focus processing module 440 may analyze location information on a main target subject and information on a relative distance (depth information) between subjects of the depth processing module 430, and correct a location of the main target subject. Then, the focus processing module 440 may modify a focus detection area in order to include the corrected main target subject, and reconfigure the corrected focus detection area in the image acquisition module 410.

Next, the focus processing module 440 may receive, from the image processing module 420, and analyze location information on a main target subject and image property information of subjects, and correct a location of the main target subject. For example, the image property information may include an indication of at least one of brightness, color, luminescence, and shape information of subjects located in a focus detection area. Then, the focus processing module 440 may correct the focus detection area in order to include the corrected main target subject, and reconfigure the corrected focus detection area in the image acquisition module 410.

Next, the focus processing module 440 may reconfigure a corrected focus detection area using multiple pieces of image property information. In addition, the focus processing module 440 may reconfigure a corrected focus detection area by granting a priority to one or more pieces of image property information. For example, if the image property information includes depth information and image brightness information of subjects in a focus detection area, the depth information may be given priority. In such instances, the focus processing module 440 may receive location information of a main target subject of the image processing module 420 and image property information of subjects. The focus processing module 440 may analyze information on a relative distance (depth information) between subjects of the depth processing module 430, and correct a location of a main target subject. At this point, the focus processing module 440 first analyzes depth information of subjects located in the focus detection area, and detects whether the depth information between subjects satisfies a predetermined condition. In some implementations, the condition may be satisfied when a relative distance (depth) between subjects is sufficiently far (e.g., when the relative distance exceeds a predetermined threshold). If the depth condition is satisfied, the focus processing module 440 may determine a corrected focus detection area including a location of a main target subject. However, if the depth condition is not satisfied, the focus processing module 440 may analyze at least one of the depth information and image property information (brightness, color, shape, etc., of subject images) and correct a location of a main target subject. Then, the focus processing module 440 may reconfigure the corrected focus detection area in the image acquisition module 410 based on an outcome of the analysis.

When correcting a focus detection area as described above, an electronic device may configure a corrected focus detection area using depth information in the focus detection area, and also configure a corrected focus detection area using the depth information and image property information (brightness, color, luminescence, shape, etc.) of subjects.

Therefore, an electronic device according to various embodiments of the present disclosure may include: a display which displays a preview image; a camera which acquires an image while focusing on a subject in a predetermined focus detection area; and a processor which analyzes a subject image property in the focus detection area, groups areas having a high similarity of the image properties, and reconfigures the grouped area as a corrected focus detection area in the camera. In this case, the image acquisition module 410 may be a camera and an output module 460 may be a display. Further, an image processing module 420, a depth processing module 430, and a focus processing module 440 may be a processor.

In addition, in the electronic device, the camera may include a pixel sensor for sensing an image and an image sensor including upper side phase-difference detection sensors for sensing a phase-difference value between subject images, and the processor may calculate depth information which is an image property of the subject by processing the phase-difference value, and reconfiguree, as the corrected focus detection area, an area having similar depth information by grouping the same.

Further, the processor in the electronic device may further obtain brightness information, which is an image property, and reconfigure, as a corrected focus detection area, an area having similar brightness information by grouping the same if a difference in depth information on the subjects is not great.

Further, the processor in the electronic device may calculate brightness information of an image, and reconfigure the corrected focus detection area by grouping areas having similar brightness information.

Correction of a focus detection area, for example, may define, as a detection area, a two-dimensional area (e.g., quadrangle) which determines a center position of a grouped area and has a corresponding center position as a geometric center. Alternatively, an area which is a particular-size larger than the two-dimensional area having a shape of the grouped area may be defined as a two-dimensional area of a focus detection area.

Further, the camera in the electronic device may include a pixel sensor for sensing an image and an image sensor including upper side phase-difference detection sensors for sensing a phase-difference value between subject images, and the processor may include an image analyzing module for processing location information on a subject by analyzing the image, a depth processing module for processing depth information on a subject by analyzing the phase-difference value, and focus processing modules for correcting an area having a high similarity to be a corrected focus detection area by analyzing depth information on a subject according to the location information on a subject.

An electronic device according to various embodiments of the present disclosure may include a camera which acquires an image in a first focus state for focusing on an image of a designated focus detection area, an input/output module which displays an image acquired by the camera and generates a gesture input for tracking a subject image selected from the displayed image, and a processor which displays a part of the area of an image selected by the sensed gesture in a second focus state for performing a tracking task and changes the tracking area on the basis of subject image property information on the part of area of the image.

The camera in the electronic device may focus on a subject in the center position of an image in a first focus state.

The processor in the electronic device may sense a touch input generated by the input/output module and sense a location of the touch input.

The processor in the electronic device may determine a subject which is to be an object for the second focus on the basis of a gesture.

The processor in the electronic device may display an image in the first focus state when a gesture input is sensed in an operation of displaying an image in the second focus state.

Figure 8:
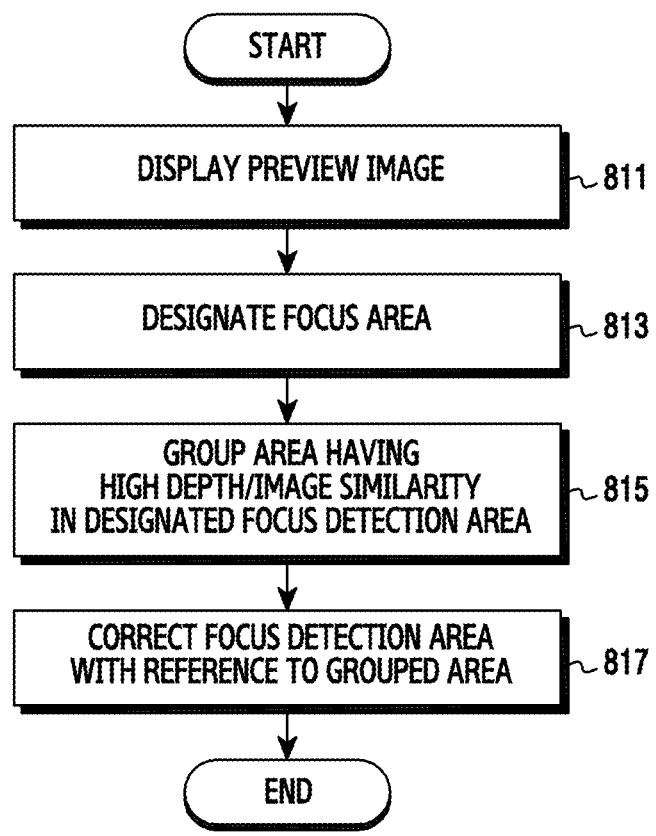
FIG. 8 is a flowchart of an example of a process, according to various embodiments of the present disclosure.

FIG. 8 is a flowchart of an example of a process, according to various embodiments of the present disclosure. As is discussed further below, the process of FIG. 8 relates to determining an object for performing primary focus detection by a user.

An electronic device may drive an image acquisition module 410, and display an image received by the image acquisition module 410 in operation 811 as a preview image in an output module 460. In addition, if a user generates a photographing command by an input module 450 in a state where the preview image is displayed, the electronic device configures a designated focus detection area in step 813. In this case, the photographing command may be a shutter-on. If a shutter-on signal is sensed by the input module 450, the electronic device may configure a focus detection mode according to a configured AF mode, and acquire an image in the configured focus detection mode. For example, if a mode is a center focus detection mode, the electronic device may control an image acquisition module 410 in step 813, and configure a focus detection area in a center position of an image sensor. Also, if a mode is a face recognition mode, the electronic device may sense the mode in step 813, detect a position in which a face is recognized in an image processed by the image processing module 420, control an image sensor of the image acquisition module 410 and configure an area in the image sensor corresponding to the position in which the face is detected as a focus detection area.

While the preview image is displayed, if a particular location is selected by an input module 450 (e.g., via a touch), the electronic device may treat a selection signal as a shooting command, and configure an area of an image sensor corresponding to the selected location as a designated focus detection area. For example, the electronic device may select, by the input module 450, a desired subject for focus detection among subjects included in a preview image. The selection of a subject may be performed by selecting a subject displayed through a touch screen. Therefore, if a particular location of an image is selected while a preview image is displayed, the electronic device may configure a selected location as a designated focus detection area.

In addition, an input for designating a focus detection area may be configured to simultaneously perform a mode change command which changes a focusing mode of a terminal from a center area focus detection mode to a tracking area focus detection mode.

After configuring the designated focus detection area, the electronic device may group areas having a same (or similar) property according to a particular reference within an area input in operation 815. In this case, the image property may include at least one of color information and shape information associated with an image, and may include depth information or phase-difference information.

Then, the electronic device may correct a focus detection area based on a result obtained from the grouping in operation 817. The corrected focus detection area may be an area having a regular area in a center position of a grouped area, and may be an area having a regular area in a center position of an expanded group area after expanding an area having a same (or similar) property in a neighboring area of the designated area as a same group.

As described above, an electronic device may display an image including a subject as a preview image on a display. The electronic device may acquire a preview image while it is in a first focus state (focusing in a focus detection mode configured in an electronic device). In such instances, if a user selects a particular subject included in a preview image, the electronic device may designate a selected location as a focus detection area. In addition, the electronic device may determine candidate areas by grouping areas having a same (or similar) property in a designated focus detection area. Then, the electronic device may correct a focus detection area on the basis of the grouped candidate area. The electronic device may then acquire an image while it is in a second focus state (focusing a focus detection area designated by a user).

Figure 9:
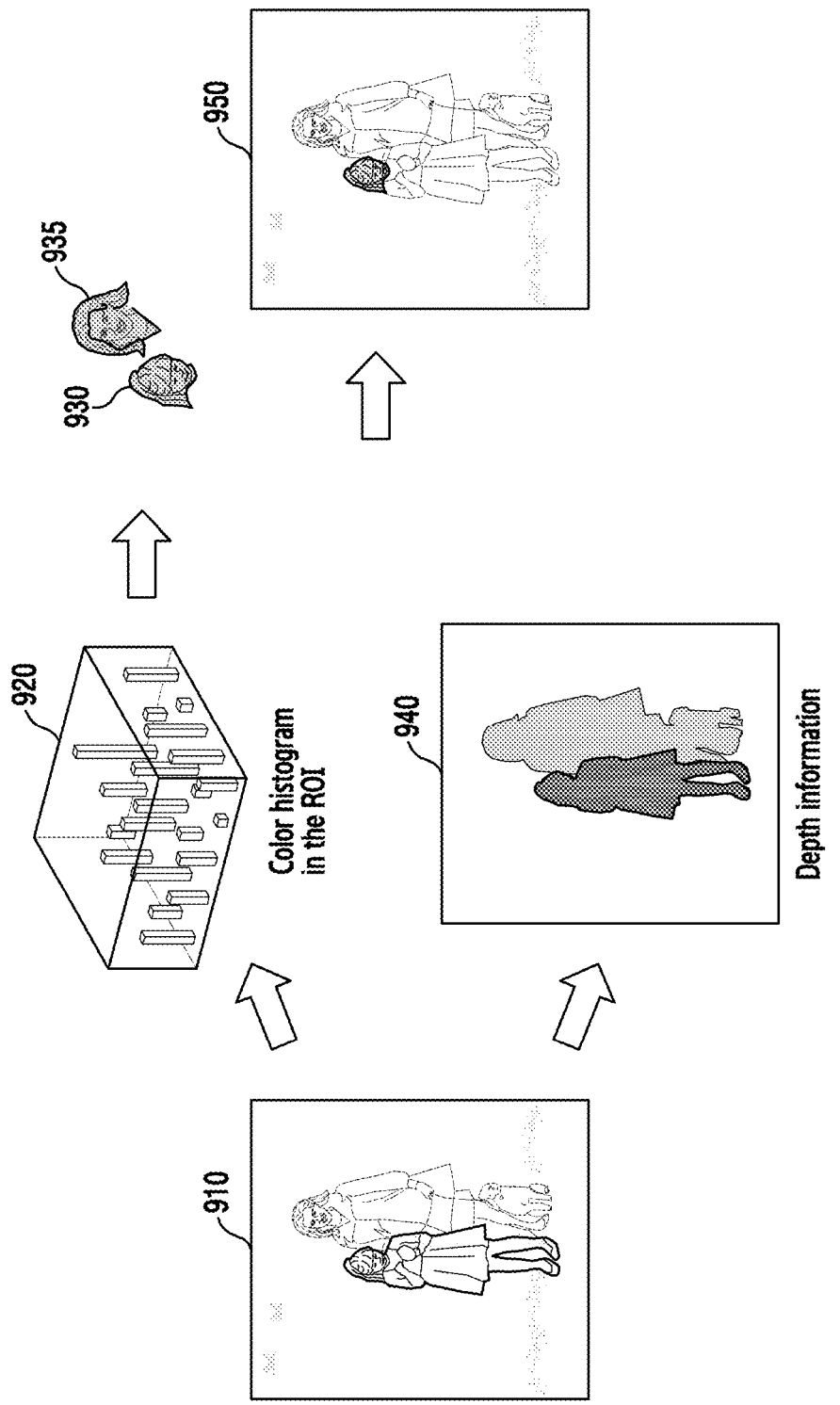
FIG. 9 is a diagram illustrating an example of a process for modifying a focus detection area, according to various embodiments of the present disclosure, an electronic device.

In some instances, if a user does not select a subject, an electronic device may designate a focus detection area by selecting a main subject included in an image, and modify the focus detection area to include the main subject. For example, when the electronic device is in a center focus mode and a user does not select a subject on a preview image, an electronic device may analyze a property of subjects (a property of subject images) located in a center focus detection area, and correct a focus detection area. FIG. 9 is a diagram illustrating an example of a process for modifying a focus detection area, according to various embodiments of the present disclosure. FIG. 9 shows an example in which a designated focus detection area is configured in response to a user input that is detected while a preview image is displayed. However, a corrected focus detection area may be configured using the same method in an AF operation mode of a center focus detection mode or a face recognition mode.

In operation 910, an electronic device may designate a particular area of an image selected by a user through an input module 410. The electronic device may identify a location in which a touch input by a user is detected through an input module 450 (e.g., a touch screen sensor having an integrated touch panel and display). In addition, the electronic device may detect a location of an image corresponding to the touch input in an image acquired by an image acquisition module 410 and an extraction module 710.

In operation 920, the electronic device may analyze an image extracted by an extraction module 710 in operation 920. According to an embodiment, an image processing module 420 may designate, as an area to be analysed, a designated focus detection area (e.g., an area of interest (ROI: Region of interest) which has a particular size and includes a center focus detection area, a face recognition area, or a user input area) in an image, and acquire a color histogram corresponding to the area. In addition, the image processing module 420 may use, in addition to a color distribution, a shape of a subject or a pattern distribution instead of a color histogram.

In operations 930 and 925, the electronic device may group and designate an area satisfying a particular condition (image property). According to an embodiment, a target detection module 725 of an image processing module 420 may check if a distribution of a color similar to skin color is above a particular value in a color histogram, and obtain a location and size of an area having a color similar to skin color in an area of interest. According to another embodiment, the electronic device may designate, as a target area, an area having a color that matches a color corresponding to a location of a touch area in a color histogram. According to aspects of the disclosure, the two colors may match when they are within a predetermined distance from one another or satisfy any other suitable matching criterion. For example, when a same image is acquired in operation 910, an electronic device may group two face areas in an area of interest like operations 930 and 935 by grouping an image property of a particular condition.

In operation 940, the electronic device may acquire depth information associated with an image of a subject located in an area of interest (a designated focus detection area). The depth information acquired in operation 940 may be raw depth data extracted by a depth extraction module 430. Raw depth data is information capable of extracting a distance formed by each area of a subject, and may be phase-difference information detected by upper side phase-difference detection sensors (phase-difference detection pixels) included in an image sensor. The depth processing module 410 may arrange raw depth data in two-dimensions by analyzing the data for each area, generate a depth map, and group areas having a similar depth. The electronic device may be configured to restrictively perform a depth map extraction with respect to an area of interest instead of an entire image for an efficient process.

In operation 950, the electronic device may correct (e.g., modify) the electronic device's focus detection. More particularly, the target correction module 743 of the focus processing module 440 receives location information on multiple group areas (target location) from a depth map and an image processing module 420, wherein the target correction module 743 may compare information on each of the depth map and the image processing module 420. According to an embodiment, the focus processing module 440 may compare depth information of multiple group areas, and correct an area of a closest group as a target location according to a depth information comparison result. According to another embodiment, a focus processing module 440 gives a weight to a group area closer to an image acquisition module 410 according to a depth information comparison result. However, in a case where the difference in depth is not great and an area formed by a corresponding group is not broad compared to the other group, the focus processing module 440 may configure to designate a broader area as a target location. A focus control module 745 may perform a focus control with respect to a subject of a detected target location.

Figure 10:
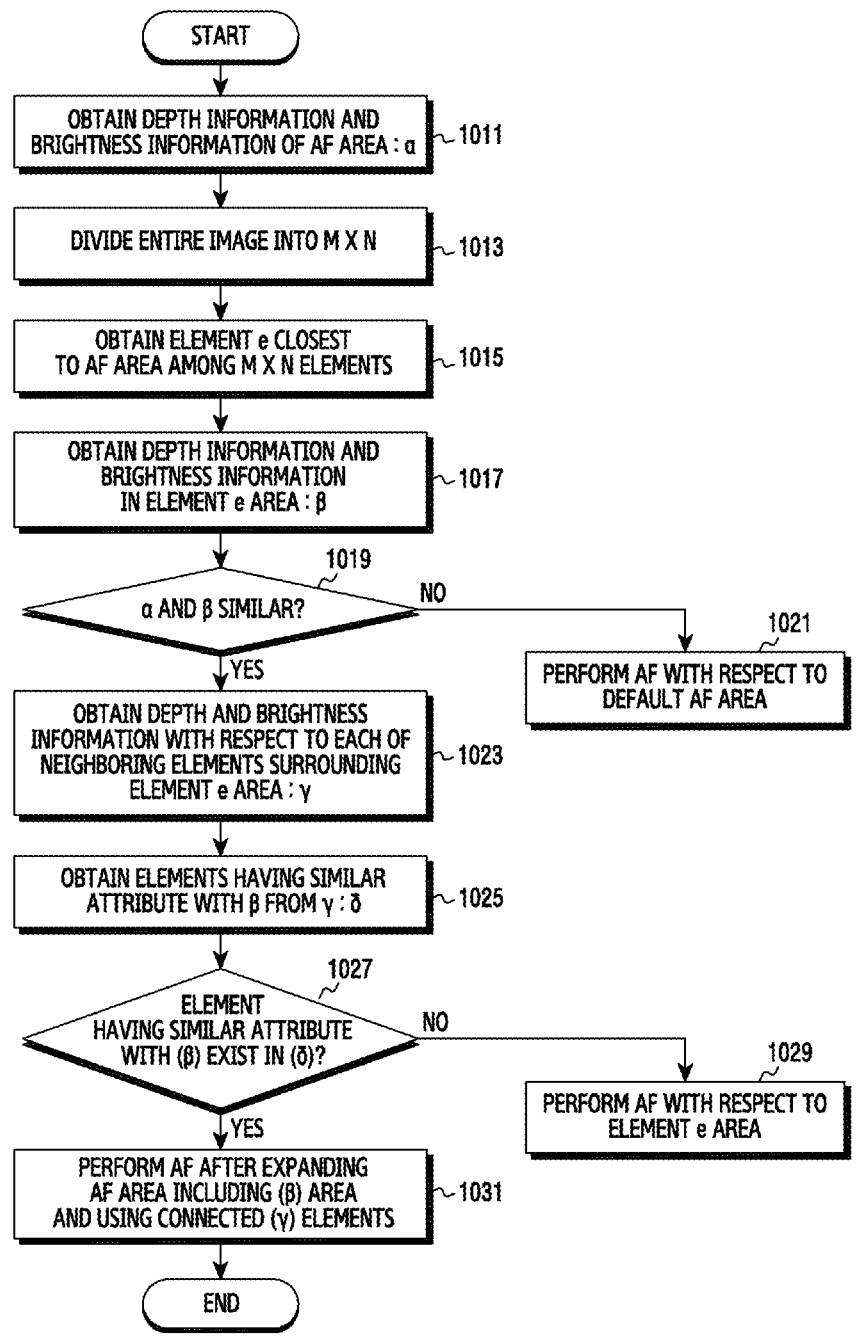
FIG. 10 is a flowchart of an example of a process, according to various embodiments of the present disclosure.

FIG. 10 is a flowchart of an example of a process, according to various embodiments of the present disclosure.

In operation 1011, an electronic device obtains image property information α (information including the depth and brightness in the AF area) on a subject located in a designated focus detection area in an image acquired by an image acquisition module 410. In this case, property information may be at least one of, or at least two of, depth information, brightness information, color information (e.g., color histogram), luminescence, and shape information of subject images. As is discussed further below, in some instances, the property information may include depth information and brightness information. In such instances, the depth information may be processed by a depth processing module 430, and brightness information may be processed by an image processing module 420. In addition, the designated focus detection area may be a default AF area. Therefore, the designated focus detection area may have a center of a screen as an AF area in a center oriented AF mode which is a default AF area, and have a recognized face location as an AF area in a face recognition AF mode. Further, a location of a target subject for tracking may be an AF area in a tracking AF mode.

Afterwards, the electronic device may reconfigure a corrected focus detection area by analyzing a property of subject images in a designated focus detection area. More particularly, in operation 1013, the electronic device divides an image acquired by an image sensor into M×N subareas (hereinafter, referred to as "element"). In operation 1015, the electronic device determines an element e which is closest to a designated focus detection area among M×N elements, in operation 1015. In this case, the element e may be included with a designated focus detection area, or may be included in a part of designated focus detection area. In operation 1017, after determining the element e, the electronic device obtains image property information β (information including the depth and brightness in the element e area) on an image of a subject located in an element area.

The electronic device analyzes image property information (α) associated with the designated focus detection area and image property information (β) associated with the element e, and detects whether two pieces of property information match. According to aspects of the disclosure, the two pieces of property information may be considered to match when they are within a threshold distance from one another and/or satisfy any other suitable matching criterion with respect to one another. If the two pieces of property information do not match, the electronic device performs an AF operation with respect to a designated focus detection area in step 1021. In addition, if image property information of two areas (a designated focus detection area and an element e area which is a closest subarea to the designated focus detection area) are similar, the electronic device may obtain property information γ (information including the depth and brightness with respect to each of neighboring elements surrounding element e area) on an image of a subject from each of neighboring elements surrounding the element e area in operation 1023. Further, the electronic device compares and analyzes image property information (β) of the element e area and image property information (γ) of neighboring element areas, and obtains elements δ (elements having a similar attribute with β from γ) of a neighboring element area having a similar attribute, in operation 1025. Then, the electronic device checks for the presence of image property information (δ) of a neighboring element area having a similar attribute with the image property information (β) of the element e area in operation 1027, and if absent, the electronic device may perform an AF operation with respect to an element e area in operation 1029. Further, if image property information (δ) of a neighboring element area having a similar attribute with the image property information (β) of the element e area is present, the electronic device may configure a corrected focus detection area for expanding a focus detection area to include an element e area and element areas having image property information (δ), and perform an AF operation in operation 1031.

As described above, an electronic device may perform the operations of obtaining image property information on a designated focus detection area, dividing an entire image into m×n areas, as shown in the example of FIG. 4, and finding an element (element e) closest to a designated focus detection area among the divided m×n element areas. In addition, the electronic device may obtain depth and brightness information on element 'e', and compare the obtained information with depth and brightness information obtained from an element e area. If the two pieces of information are not similar (e.g., do not match), the electronic device may determine that it is not necessary to move a designated AF area and change the size thereof, and perform a focusing (performing an AF with respect to a default AF area) with respect to a designated AF area. However, if information on two area is similar (e.g., if the two pieces of information match), the electronic device may obtain depth and brightness information on each of neighboring elements surrounding the element 'e', and neighboring elements may be able to repeatedly expand in a radial shape within a range of m×n. Further, the electronic device may compare depth and brightness information on element 'e' with depth and brightness information on elements of a neighboring area for similarity. In this case, if the comparison result has no similarity, the electronic device may perform an AF with respect to the element 'e' area. Further, if the comparison result has a similarity, the electronic device may correct an AF area (configuring corrected focus detection area) to include element areas having a similarity (e.g., element areas that match) and perform an AF function.

Correction of the focus detection area, for example, may define, as a detection area, a two-dimensional area (e.g., quadrangle) which determines a center position of a grouped area and has a corresponding center position as a geometric center. Alternatively, an area which is a particular-size larger than the two-dimensional area and has a shape of the grouped area may be defined as a two-dimensional area of a focus detection area.

FIGS. 11A-D are diagrams illustrating an example of a process for modifying a focus detection area, according to various embodiments of the present disclosure.

Figure 11A:
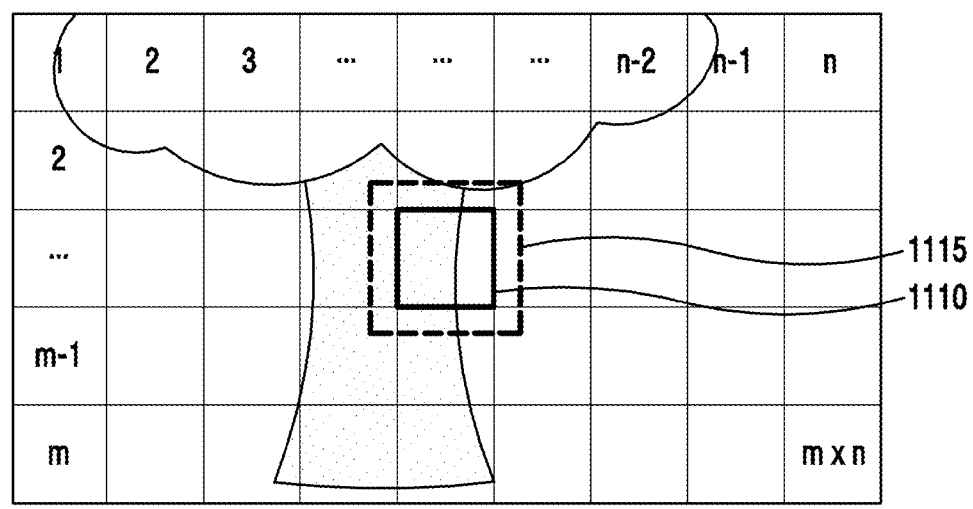
FIG. 11A is a diagram illustrating an example of a process for modifying a focus detection area, according to various embodiments of the present disclosure.
Figure 11B:
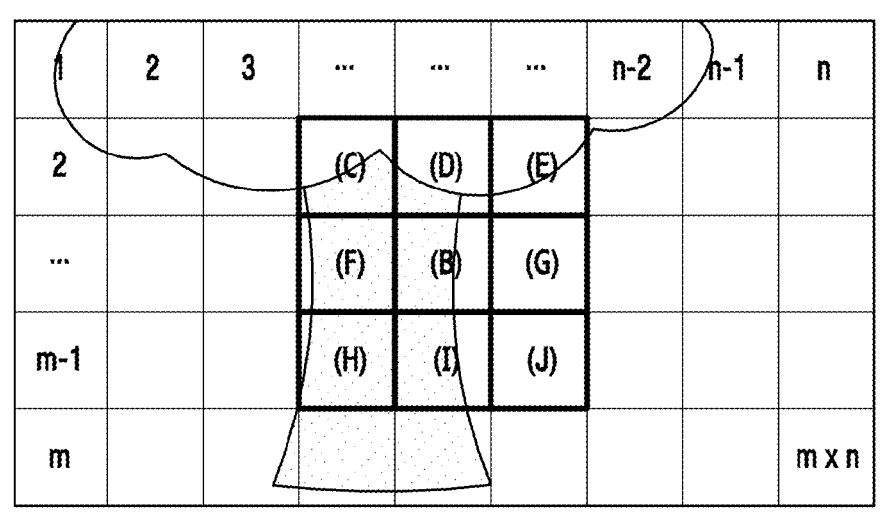
Figure 11C:
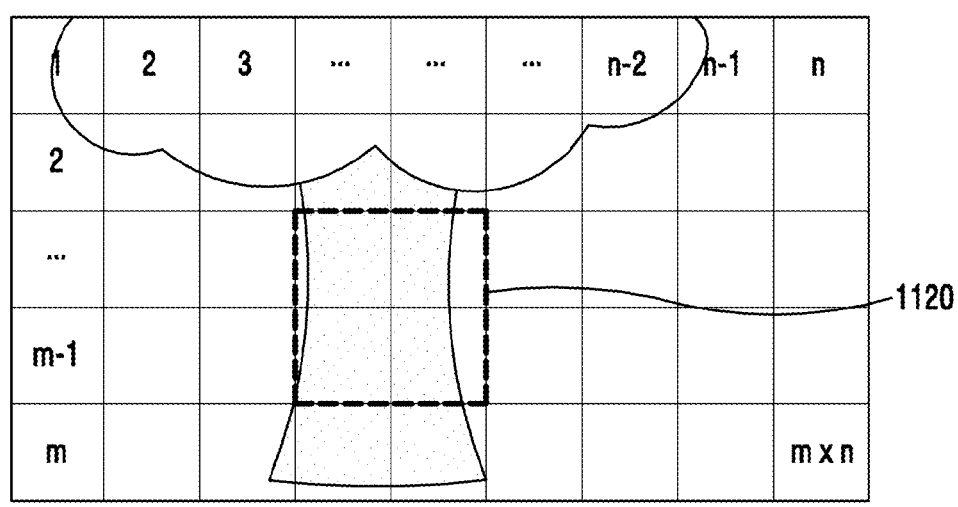
FIG. 11C is a diagram illustrating an example of a process for modifying a focus detection area, according to various embodiments of the present disclosure.

According to the process, a focus processing module 440 receives phase-difference information and brightness information from an m×n number of elements before starting focus detection, and finds a location of an element e (reference numeral 1110 in FIG. 11A) which is closest to a designated focus detection area (a default AF area) 1115 of FIG. 11A. For example, if a target subject is a tree and an AF mode is a center focus detection mode like in FIG. 11A, a designated focus detection area may be 1115 and an element area e close to the designated focus detection area may be 1110. The FIG. 11A indicates that a designated focus detection area located in the middle of an image includes background information as well as tree information. In this case, since the background is too complicated, the background may be focused on, not the tree. An electronic device according to various embodiments of the present disclosure may obtain an element area closest to a designated focus detection area and image property information in order to move an AF area to a tree-side which is a target subject for an accurate focusing.

Figure 11D:
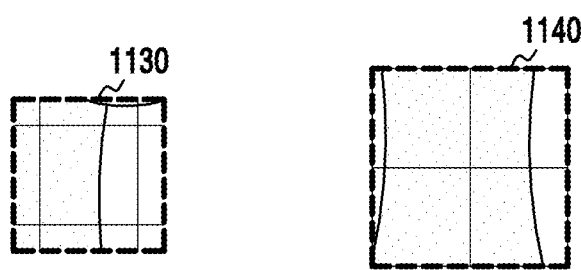
FIG. 11D is a diagram illustrating an example of a process for modifying a focus detection area in a center AF mode, according to various embodiments of the present disclosure.

In addition, the electronic device obtains depth information and brightness information on an element e area (element area (B) in FIG. 11B), and then may obtain depth information and brightness information on neighboring element areas (element area (C)—element area (J)) surrounding an element area (B) in FIG. 11B. The neighboring element area may be expanded radially and examined, and FIG. 11B describes only a first expansion in order to reduce the complexity of a description thereof. Then, an electronic device, like 1120 of FIG. 11C, may configure a corrected focus detection area by selecting a neighboring area having information similar to depth information and brightness information of an element area (B) which is found primarily. FIG. 11D illustrates an example in which a designated focus detection area has been corrected. In FIG. 11D, reference numeral 1130 may denote a designated focus detection area illustrated in FIG. 11A. In addition, reference numeral 1140 of FIG. 11D may denote a corrected focus detection area which is controlled using a same method as that for FIG. 11C. Therefore, more data of a target subject may be obtained in an AF area having a modified location and/or size rather than a default AF area.

Figure 12A:
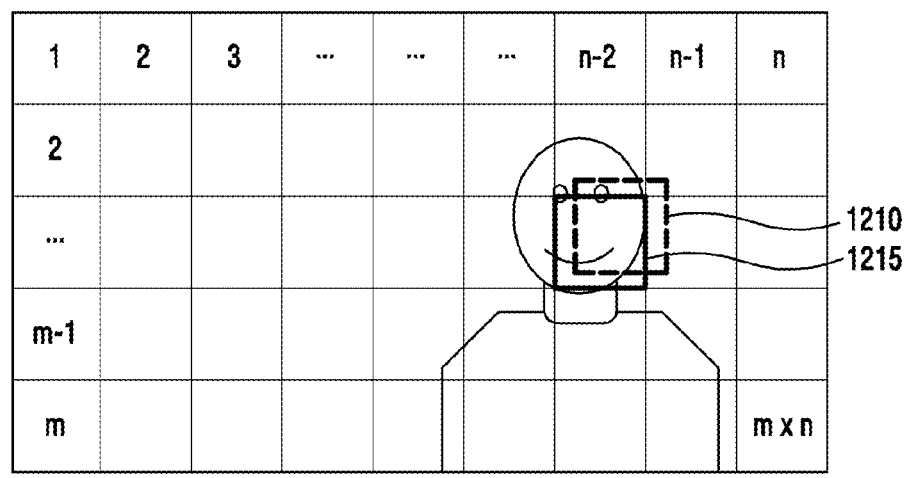
FIG. 12A is a diagram illustrating an example of a process for modifying a focus detection area, according to various embodiments of the present disclosure.
Figure 12B:
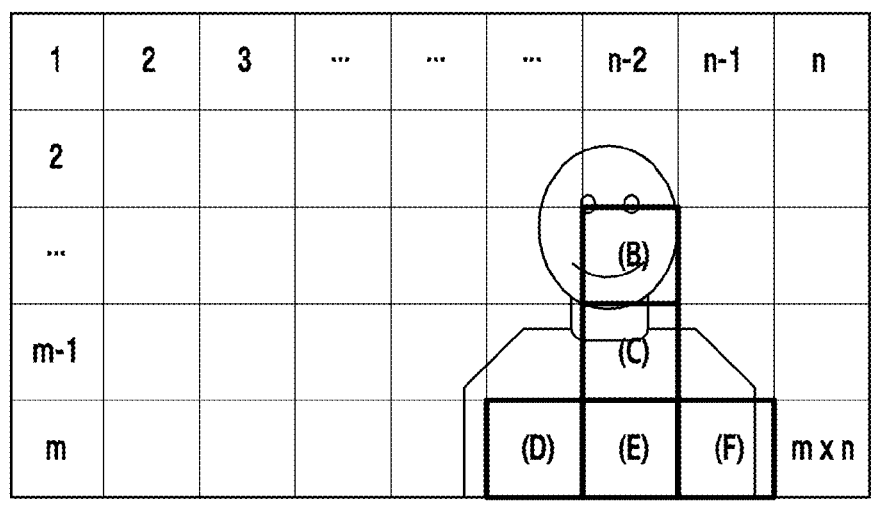
FIG. 12B is a diagram illustrating an example of a process for modifying a focus detection area, according to various embodiments of the present disclosure.
Figure 12C:
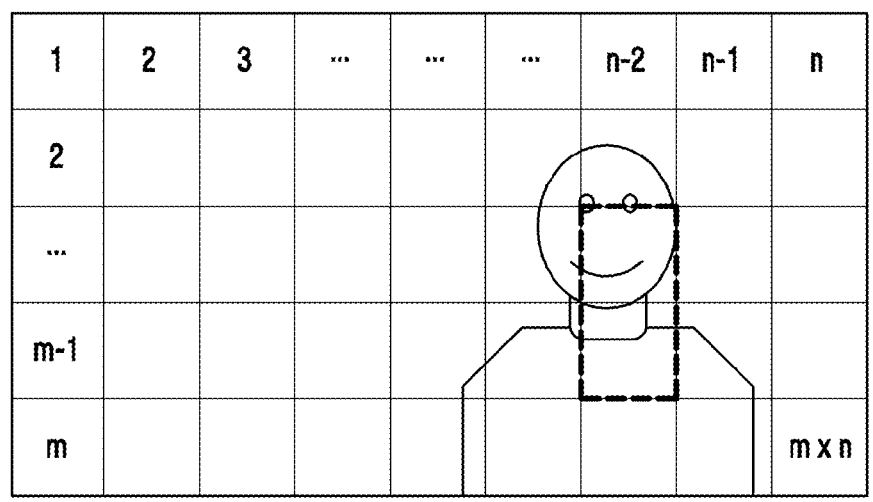
FIG. 12C is a diagram illustrating an example of a process for modifying a focus detection area, according to various embodiments of the present disclosure.

FIGS. 12A-C are diagrams illustrating an example of a process for modifying a focus detection area, according to various embodiments of the present disclosure. More particularly, FIGS. 12A-C correspond to an embodiment the present disclosure and relate to a step-by-step operation of expanding a focus detection area through classifying a similar group around an area.

In FIG. 12A, reference number 1210 denotes a face-recognized area and 1215 indicates an element e area closest to a face recognition area 1210 among m×n number of elements. The electronic device may obtain property information of neighboring element areas close to the element e area 1215, and compare and analyze the property information. More particularly, in some implementations, the electronic device may obtain property information of element areas that are within a predetermined distance from the area 1215. FIG. 12B illustrates an example in which elements having similar depth and brightness information among elements around an element e 1215 (element (B) in FIG. 12B) of FIG. 12A are element (C), element (D), element (E), and element (F). In addition, FIG. 12C illustrates an element area (a corrected focus detection area) finally selected as an AF area among elements found in FIG. 12B. The electronic device may perform focusing with reference to the corrected focus detection area. An AF area of FIG. 12C has much less background interference than a face recognition AF area 1210, and may also have an improved stability of an AF calculation value due to an increased size of the AF area.

FIG. 13 is a diagram illustrating an example of a process for changing the focus mode of an electronic device, according to various embodiments of the present disclosure. According to the process, a tracking AF mode may be configured through a menu, or by a user selection during the display of a preview image on a screen. In operation 1310, a preview mode or a focus detection area in a primary camera driving mode may be "a center focus detection mode" which performs focusing with reference to a center area of a screen. The center focus detection mode may be a mode in which focus detection is performed mainly in an area corresponding to a center position in an image acquired by an image acquisition module 410. The electronic device may display, through an output module 460, a focus detection mode in the center position of an image (e.g., a cross-hair) displayed on a display. In addition, the electronic device may obtain image and/or depth information in a predetermined sized-area including a center position, and perform an operation of controlling a focus based on the obtained image and/or depth information. For example, a terminal may acquire an image having a focus on different locations for multiple image frames, and determine, as a focus detection condition, a condition in which a frame having a highest contrast in a center position among corresponding images has been acquired. In this case, a method for configuring a corrected focus detection area may be performed using the same procedure as in FIG. 8 or FIG. 10.

In operation 1320, if a user touches a particular area on a screen, the electronic device simultaneously performs an operation of changing a focus detection mode and analyzes an image area having been touched, and discloses tracking and focus area detection. For example, if a user selects a face area of a child displayed by an input module 450, an electronic device may designate a face of the child as a target of tracking and as a focus detection area, and change a focus detection mode of the electronic device from a center focus detection mode to a tracking focus detection mode at the same time. When the electronic tracking device is in the tracking focus detection mode, the electronic device may adjust a focus detection area by tracking a movement of a configured subject like 1330 of FIG. 13. In 1330 of FIG. 13, an electronic device may correct a focus area by tracking a face movement of a child.

While a tracking mode is being performed like 1330 of FIG. 13, if a random area on a screen is selected like 1340 of FIG. 13, the electronic device may sense the selection like 1350 and return to a previous focus detection mode (e.g., a center focus detection mode).

FIG. 14 is a flowchart of an example of a process, according to various embodiments of the present disclosure.

Referring to FIG. 14, an electronic device may configure (e.g., modify) a focus detection mode for acquiring an image. The focus detection mode may be configured using a menu. However, a user of an electronic device may need to change a focus detection mode for performing a photographing mode. For example, when photographing a child or a pet, a subject may go astray from a configured focus detection area or span a part of a focus detection area. In this case, it may be preferable that an electronic device performs a tracking AF mode capable of correcting a focus detection area by tracking a moving subject.

In operation 1411, a center position reference AF mode may perform focus detection with reference to an image in a center area of the image. Tracking AF area designation may occur based on an input signal of an input module by a user, and may be performed by touching an area desired for tracking AF among images being displayed on a screen in a display having a touch panel which is a type of an input module. In operation 1413, a tracking area is designated. In operation 1415, the electronic device may perform a tracking AF mode. An operation of the tracking AF area designation may be used as a signal to change a focus detection mode from a center position reference AF mode to a tracking AF mode, and thus, the electronic device may simultaneously perform a change of a focus detection mode and designation of a tracking area.

The electronic device may be configured to change a focus detection mode to a center position reference AF mode based on a touch input signal in any or particular location while operating in a tracking AF mode. In operation 1417, the electronic device may detect that a particular location in the image is selected (e.g., touched). In operation 1419, if a selection of any location is sensed, the electronic device may return to a previous focus detection mode (e.g., a center focus detection mode) and perform a focus detection operation. According to another embodiment, an electronic device may be configured to change a focus detection mode based on an Air Gesture input, a voice input, shaking of an electronic device, or a signal from an external electronic device in addition to a touch input.

Figure 15:
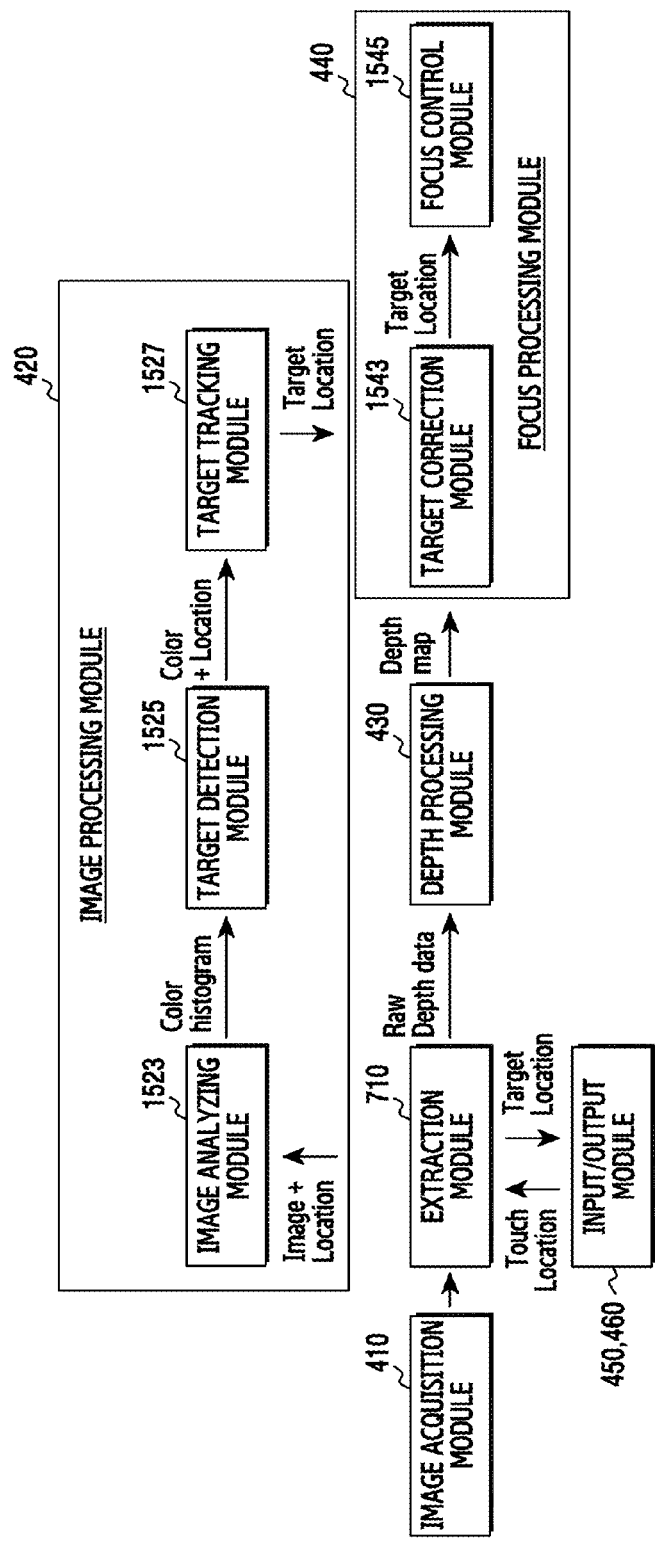
FIG. 15 is a diagram of an example of an electronic device, according to various embodiments of the present disclosure.

FIG. 15 is a diagram of an example of an electronic device, according to various embodiments of the present disclosure. An electronic device according to various embodiments of the present disclosure may include an image acquisition module 410, an extraction module 710, an image processing module 420, a depth processing module 430, a focus processing module 440, an input module 450, an output module 460, and a storage module 470. Here, the extraction module 710 may be a module which extracts an image and depth information from an output of the image acquisition module 410. In this case, the image extraction module 710 may be included in the image processing module, and a depth extraction module may be included in the depth processing module 430.

In some implementations, the image processing module 420 may include an image analyzing module 1523, a target detection module 1525, and a target tracking module 1527. In addition, a focus processing module 440 may include a target correction module 1543 and a focus control module 1545.

The image acquisition module 410 may include a camera module. The camera module may have an image sensor including color pixels and phase-difference detection pixels. The image acquisition module 410 may generate image data of subjects, phase-difference information according to a relative distance, and the like.

The input module 450 may be a touch panel, and the output module 460 may be a display. Therefore, the input/output modules 450 and 460 may be a touch screen in which a touch panel and a display are integrally configured. If a particular location is selected through the input module 450 during the display of a preview image, the electronic device may configure (e.g., designate) the touched location as a focus detection area. Further, the electronic device may display the selected designated focus detection area on the output module 460.

The extraction module 710 may extract each of image data and a phase-difference signal outputs by the image acquisition module 410. In such instances, the extraction module 710 may extract a high pixel image and transmit the same to the image processing module 420, and extract a low pixel image and process the same to the depth processing module 430. For example, the extraction module 710 may be included in each of an image processing module 420 and depth processing module 430, as described above. Alternatively, the image processing module 420 may perform a function of an extraction module 710.

An image processing module 420 may have an image analyzing module 1525, a target detection module 1525, and a target tracking module 1527. The image analyzing module 1523 may analyze image data output by the extraction module 710 and calculate a color histogram according to an image property of subjects. The target detection module 1523 may detect a location of subjects (color+location) existing within a focus detection area by analyzing the color histogram. The target tracking module 1527 may track a location of a tracked subject (target location) by tracking a movement detected by the target detection module 1525. The image processing module 420 may track a subject of a high pixel image.

A depth processing module 430 may calculate and process three-dimensional location information on subjects constituting an image by analyzing depth information (e.g., the phase-difference information) output by the extraction module 710. The depth processing module 430 may be a device which extracts information relating to a distance between a terminal and a subject or a surface shape of a subject through calculation on the basis of a signal output from an image sensor of the image acquisition module 410 or a device capable of acquiring depth information. The depth processing module 430 may track a subject of a low pixel image.

A focus processing module 440 may include a target correction module 1543 and a focus control module 1545. The target correction module 1543 may analyze tracking location information of a main target subject output by a target tracking module 1527 of the image processing module 420 and relative distance information (depth information) between subjects of the depth processing module 430, and correct a location of the main target subject. The focus control module 745 may correct (e.g., modify) a focus detection area to include the corrected main target subject, and configure a corrected focus detection area in the image acquisition module 410.

Therefore, an electronic device according to various embodiments of the present disclosure may include a camera which acquires an image in a first focus state for focusing on an image of a designated focus detection area, an input/output module which displays an image acquired by the camera and generates a gesture input for tracking a subject image selected from the displayed image, and a processor which displays a part of the area of an image selected by the sensed gesture in a second focus state for performing a tracking task and changes the tracking area on the basis of subject image property information on the partial area of the image. In such instances, the camera may be an image acquisition module 410, an input/output module may be an input module 450 and an output module 450, and the processor may be an image processing module 420, a depth processing module 430, and a focus processing module 440.

In the electronic device, the camera may be a device which focuses on a subject located in a center of an image in a first focus state.

In the electronic device, the processor may be a device which senses a touch input generated by the input/output module and senses a location of the touch input.

In the electronic device, the processor may be a device which determines a subject to be focused on in the second focus state based on a gesture.

In the electronic device, the processor may be a device which displays an image in the first focus state when a gesture input is sensed in an operation of displaying an image in the second focus state.

Figure 16:
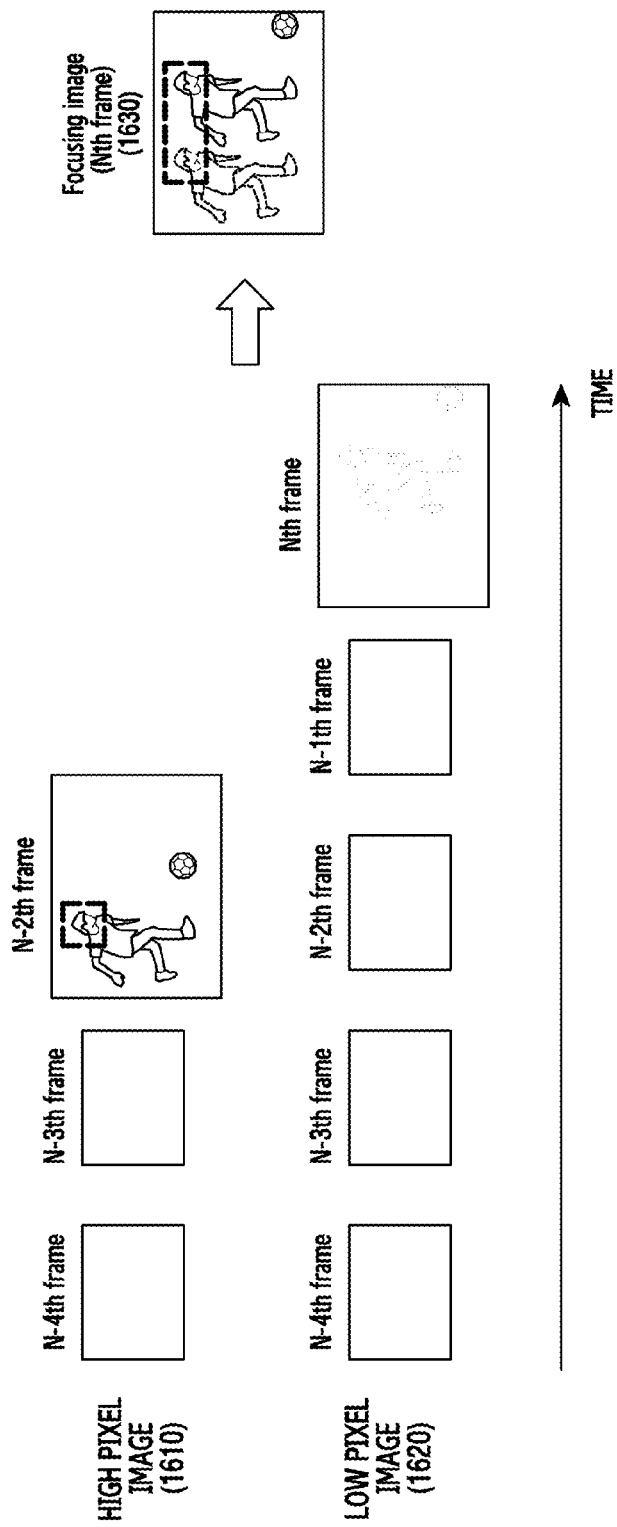
FIG. 16 is a diagram illustrating an example of a process for modifying a focus detection area, according to various embodiments of the present disclosure.

FIG. 16 is a diagram illustrating an example of a process for modifying a focus detection area, according to various embodiments of the present disclosure.

In operation 1610, an electronic device may track a movement of a main target subject while tracking a high pixel image and a low pixel image when performing a tracking AF operation. An image analyzing module 1523 of an image processing module 420 may extract an image attribute (e.g., a color histogram) of a particular area and output the same to a target detection module 1525. In addition, a target detection module 1525 may detect an area of a subject corresponding to the image attribute, and a target tracking module 1527 may perform an operation of updating a target location to a new location of a moving subject by tracking an output by the target detection module 1525.

In operation 1620, the electronic device may process a low pixel image. According to an embodiment of the present disclosure, a depth processing module 430 may process a low pixel image and a target location. An electronic device may not be able to track a high pixel image in real time due to a limitation in image processing capability. Therefore, it may be effective to track a moving subject in real time using a low pixel image. In this case, an electronic device may have a time difference in analyzing a high pixel image and a low pixel image, and the result obtained as a result of analyzing the low pixel and the high pixel image having the time difference may be transmitted to a target correction module 1543 of a focus processing module 440. For example, in FIG. 16, a high pixel image like 1610 may have a delay time of 2 frames compared to a low pixel image like 1620. Therefore, a tracking outcome of a high pixel image and a low pixel image of a frame ($N^{th}$ frame) in real time requires a control of a focus detection area. A low pixel image generating a relatively small delay like 1620 of FIG. 16 may be substantially in the same timeline as a frame ($N^{th}$ frame) to be focus-controlled, and may provide the newest information even though the accuracy of tracking decreases by the low pixel image. Thus, a corrected focus detection area may be configured by analyzing a focus detection area (e.g., configuring using a high pixel image) of a time instant at which tracking AF starts and a focus detection area (e.g., configuring using a low pixel image) of a time instant at which tracking ends.

In operation 1630, a target correction module 1543 of the focus processing module 440 may configure (e.g., modify) an area to be focus-controlled based on a tracking result of a high pixel image like 1610 and a tracking result of a low pixel area like 1620. For example, in instances in which the difference between a location of an $N-2^{th}$ high pixel image like 1610 of FIG. 16 and a location of an $N^{th}$ low pixel image like 1620 of FIG. 16 is greater than a predetermined threshold, the focus processing module 440, like 1630 of FIG. 16, may correct a new area including all center areas of two areas to be a focus detection area. The corrected focus detection area may have an additional correction step for more accurate focus detection, may compare a high pixel image of the $N-2^{th}$ frame, having more information on an image but lower accuracy, with a low pixel image, for focus detecting, of the $N^{th}$ frame, and may reconfigure an area having a similarity above a predetermined value as a corrected focus detection area like 1630 of FIG. 16.

Figure 17:
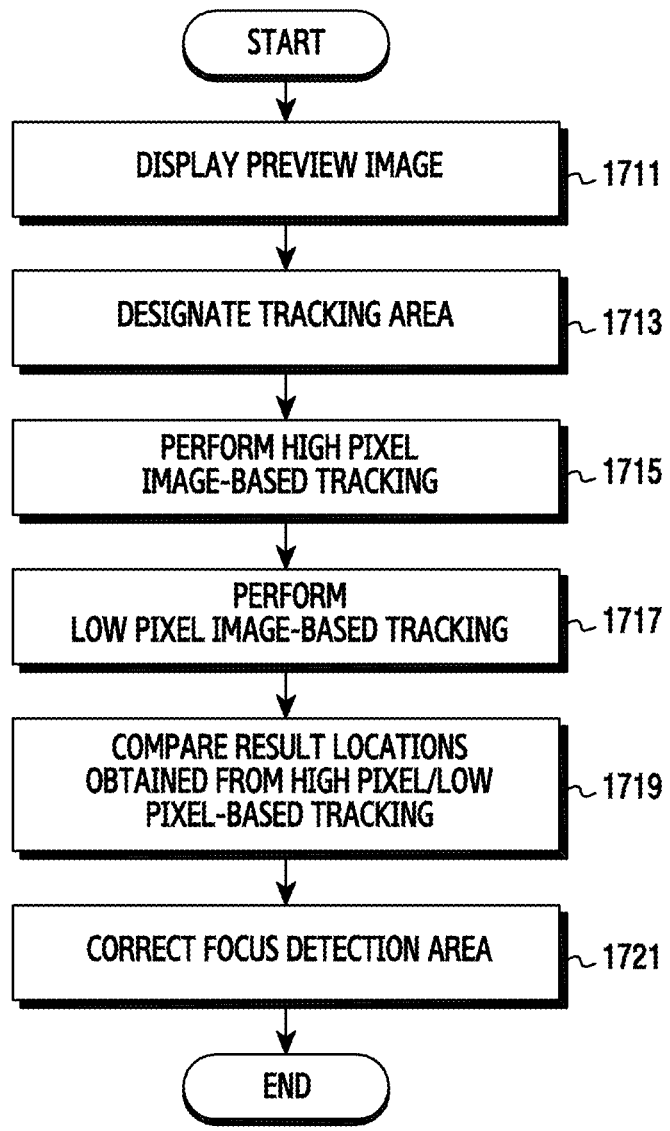
FIG. 17 is a flowchart of an example of a process, according to various embodiments of the present disclosure.

FIG. 17 is a flowchart of an example of a process, according to various embodiments of the present disclosure. The tracking focus detection operation may relate to an operation of obtaining an accurate focus detection area through tracking in a case where an area to be detected changes by a movement of a subject.

In operation 1711, an electronic device may display a preview image. While the preview image is displayed, the preview image may be focused on a subject in a designated focus detection area, such as the designated focus detection area 1310 of FIG. 13. In operation 1713, while the preview image is displayed, a user may select a particular subject that is displayed in the preview image, and the electronic device may configure a tracking AF mode in operation 1713 if the selected subject is a moving subject.

In operation 1715, the electronic device may perform a high pixel image—based tracking. In operation 1717, the electronic device may perform a low pixel image-based tracking. The high pixel image tracking may include an operation of obtaining attribute information on a tracking target from a reference frame among multiple frames of a high pixel image, and determining an area having similar attribute information obtained from an image of the other frame as a location area of a subject. The low pixel image tracking may be a depth map image and detects a similarity among frames by using an image processed by a processor which performs a small amount of calculations relative to a high pixel image and may perform a high-speed calculation, and uses the detected similarity to figure out a movement location of a moving subject.

In operation 1719 the electronic device may compare the results obtained as a result of the low pixel and high pixel tracking. The electronic device, in operation 1719, may compare calculation results obtained from a time difference between a tracking calculation using a low pixel image and a high pixel image-based tracking calculation, and determine whether locations estimated to be locations of a subject are different or similar based on the result of the two calculations. In addition, if a difference between the two detected locations is above a predetermined level, the electronic device may newly configure a predetermined area including the two locations and perform an operation of correcting a corresponding area to be a focus detection area, in operation 1721. An operation method of an electronic device according to various embodiments of the present disclosure may include the operations of: acquiring and displaying an image in a first focus state through a display functionally connected to the electronic device; sensing a gesture for selecting a part of the area of the image being displayed; displaying a part of the area of an image selected by the sensed gesture in a second focus state for performing a tracking task, and changing the tracking area on the basis of subject image property information on the part of the area of the image.

In addition, the operation of displaying an image in the first focus state may be an operation of focusing on a subject on the basis of a center position of the image.

Further, the operation of sensing a gesture may be an operation of sensing a user touch input and a location through a touch screen functionally connected to the electronic device.

Further, the operation of displaying an image in the second focus state may be an operation of determining a subject to be a target of the second focus.

Further, the operation method of the electronic device may further include an operation which returns to an operation of acquiring and displaying an image in the first focus state when a gesture for selecting any location of an image is sensed, in an operation of displaying an image in the second focus state.

Figure 18:
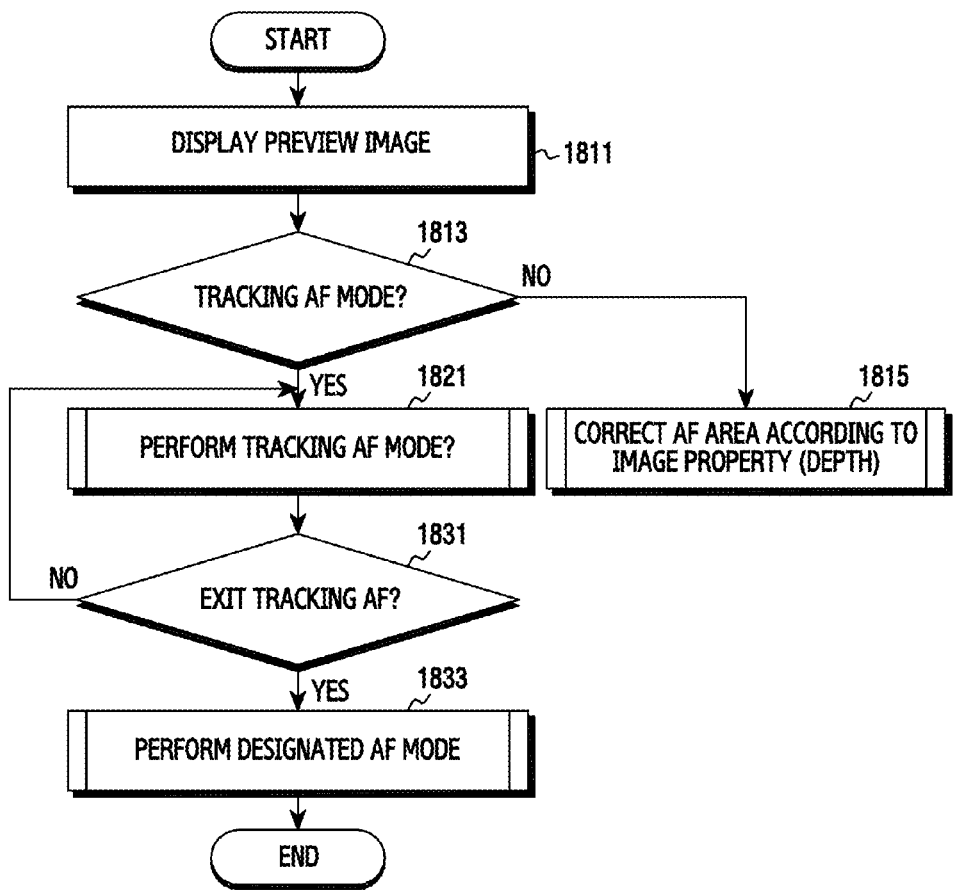
FIG. 18 is a flowchart of an example of a process, according to various embodiments of the present disclosure.

FIG. 18 is a flowchart of an example of a process, according to various embodiments of the present disclosure.

Referring to FIG. 18, an electronic device may display a preview image in operation 1811. The electronic device may check a designated AF mode while displaying a preview image. In such instances, if the AF mode is configured as a center focus detection mode or a face recognition mode, the electronic device may check the configuration in operation 1813, and correct a focus detection area by analyzing a property of a subject image in the focus detection area in stage 1815. The image property may include depth information, brightness information, color information, shape information, etc., of a subject image. An electronic device groups areas having a high similarity by analyzing image property information on a subject in a focus detection areas. In this case, a method for selecting the area includes selecting an element area having an image property similar to a focus detection area, determining an expanded element area having a property similar to the selected area, and reconfiguring the determined element areas as a focus detection area. More particularly, in some implementations, the electronic device may analyze attributes of a subject image located in a designated focus detection area, group areas having a high similarity, and perform an operation of correcting a focus detection area with reference to the grouped area.

If a user selects an image screen being displayed during an execution of a focus detection method of a center focus mode or a face recognition mode, the electronic device may sense a tracking AF mode in operation 1813, and perform a tracking AF operation in operation 1821. For example, if a subject being displayed is selected, the electronic device may track the selected subject and perform a tracking focus detection mode for reconfiguring a focus detection area. In addition, the electronic device may further perform an operation of tracking a low pixel image in order to track a moving subject in real time. In this case, an image processing module may track a movement of a subject by tracking a high pixel image, and a depth processing module may track a movement of a subject by tracking a low pixel image in real time. Then, the electronic device compares result locations obtained as a result of the high pixel and low pixel-based tracking, and may correct a focus detection area on the basis of two locations if a location difference of a subject between the two tracked images is above a predetermined value by analyzing the result of the comparison. For example, the electronic device may track a movement of a subject in real time in a location of the subject from the time point at which a tracking focus detection has been executed, and configure an area, as a focus detection area, including a location of the subject up to the time point at which a tracking is ended.

After performing the tracking focus detection mode or while performing a tracking focus detection mode, if a user selects any location on a screen, in step 1831, the electronic device may exit the tracking focus detection mode, and re-perform a designated focus detection area (e.g., a center focus detection mode) in step 1833.

An operation method of an electronic device according to various embodiments of the present disclosure may include the operations of displaying a preview image, designating a focus detection area of the displayed image, and analyzing the image property of the designated focus detection area and grouping areas with a high similarity, thereby determining a focus detection area to be corrected.

In addition, in an electronic device, an operation of determining the corrected focus detection area may configure, as a corrected focus detection area, an area to be grouped according to a depth property of subjects in the designated focus detection area.

Further, the operation method of an electronic device may further include an operation of obtaining a brightness of subjects of the designated focus detection area, and an operation of determining the corrected focus detection area may configure an area to be grouped based on the brightness property as a corrected focus detection area if a difference in depth information on subjects of the designated focus detection area does not satisfy a configured value.

Further, in the electronic device, the operation of determining a corrected focus detection area may include the operations of: obtaining image property information on a subject of a designated focus detection area; dividing an image into multiple element areas, and obtaining image property information on a subject of a reference element area close to the designated focus detection area; if image property information on the reference element area has a similar attribute than image property information on the designated focus detection area, obtaining image property information on a subject of neighboring elements; and reconfiguring a corrected focus detection area as an area including an expanded element area having a similar attribute with the reference element area and property information on the reference element area.

Further, the image property information may include depth information on an image.

As described above, a primary focus detection mode may be a first focus state, and a state in which a user performs a tracking AF mode in a state of performing a first focus may be a second focus state.

An operation method of an electronic device according to various embodiments of the present disclosure may include the operations of: displaying an image in a first focus state through a display functionally connected to an electronic device; sensing and identifying a gesture; displaying at least a part of the image in a second focus state on the basis of the sensed gesture, and displaying a tracking area in at least a part of the image by the second focus state; and changing the tracking area on the basis of depth information on the part of the image.

The operation of displaying an image in a first focus state may include an operation of focusing on a subject on the basis of a center position of the image.

The operation of sensing and identifying a gesture may include an operation of sensing a user touch input through a touch screen functionally connected to the electronic device, and an operation of checking a location of the touch input.

The operation of displaying an image in a second focus state may include an operation of determining a subject to be a target subject of the second focus on the basis of the gesture, and an operation of displaying the second focus corresponding to a movement of the subject.

The operation of determining a subject may include an operation of determining a subject on the basis of at least one of the gesture and the distance of the subject.

The various embodiments of the present disclosure disclosed herein and shown in the drawings are merely specific examples presented in order to easily describe technical details of the present disclosure and to help the understanding of the present disclosure and are not intended to limit the scope of the present disclosure. Therefore, it should be construed that, in addition to the embodiments disclosed herein, all modifications and changes or modified and changed forms derived from the technical idea of the present disclosure fall within the scope of the present disclosure.

FIGS. 1-18 are provided as an example only. At least some of the operations discussed with respect to these figures can be performed concurrently, performed in different order, and/or altogether omitted. It will be understood that the provision of the examples described herein, as well as clauses phrased as "such as," "e.g.", "including", "in some aspects," "in some implementations," and the like should not be interpreted as limiting the claimed subject matter to the specific examples.

The above-described aspects of the present disclosure can be implemented in hardware, firmware or via the execution of software or computer code that can be stored in a recording medium such as a CD-ROM, a Digital Versatile Disc (DVD), a magnetic tape, a RAM, a floppy disk, a hard disk, or a magneto-optical disk or computer code downloaded over a network originally stored on a remote recording medium or a non-transitory machine-readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein. Any of the functions and steps provided in the Figures may be implemented in hardware, software or a combination of both and may be performed in whole or in part within the programmed instructions of a computer. No claim element herein is to be construed under the provisions of 35 U.S.C. 112, sixth paragraph, unless the element is expressly recited using the phrase "means for".

Moreover, the embodiments disclosed in this specification are suggested for the description and understanding of technical content but do not limit the range of the present disclosure. Accordingly, the range of the present disclosure should be interpreted as including all modifications or various other embodiments based on the technical idea of the present disclosure.

What is claimed is:

1. An electronic device comprising:
    a memory storing instructions;
    a display;
    a camera; and
    at least one processor operatively coupled to the display, the camera, and the memory, the at least one processor configured to execute the instructions to:
    display a preview image regarding an image being acquired through the camera;
    detect brightness information on a plurality of areas of the preview image;
    identify, among the plurality of areas of the preview image, a first area for determining an auto focus (AF) area, based on an attribute of each of the plurality of areas;
    identify, among the plurality of areas, at least one area with a second attribute corresponding to a first attribute of the first area; and
    display, over the preview image, a second area including the at least one area as the AF area,
    wherein the first attribute is regarding first brightness information comprised in the brightness information on the plurality of areas, and
    wherein the second attribute is regarding second brightness information comprised in the brightness information on the plurality of areas.

2. The electronic device of claim 1, wherein the at least one area is disposed on a surrounded area of the first area, and wherein the second area further comprises the first area.

3. An electronic device comprising:
    a memory;
    a camera;
    an input/output module; and
    at least one processor operatively coupled to the memory, configured to:
    acquire an image through the camera including a first focus detection area while the electronic device is in a first focus state;
    display the image on the input/output module;
    detect brightness information on a plurality of areas of the image;

detect an input for tracking a subject depicted in the image, wherein the input selects a first area regarding a first attribute in the image in which the subject is depicted;

change the first focus state to a second focus state for tracking the subject in response to the input, wherein the second focus state is associated with a second focus detection area regarding a second attribute; and change the first focus detection area to a second focus detection area based on the brightness information, wherein the first attribute is regarding first brightness information comprised in the brightness information on the plurality of areas, and wherein the second attribute is regarding second brightness information comprised in the brightness information on the plurality of areas.

4. The electronic device of claim 3, wherein when the electronic device is in the first focus state, the focus detection area is located in a central position of the image.

5. The electronic device of claim 3, wherein detecting the input for changing the first focus state to the second focus state includes sensing a signal generated by the input/output module and identifying a location of the input based on the signal.

6. The electronic device of claim 3, wherein the at least one processor is further configured to identify the subject based on the input.

7. The electronic device of claim 3, wherein the at least one processor is further configured to change the first focus state to the second focus state in response to detecting a sub-sequent input.

8. A method for an electronic device comprising:
displaying a preview image regarding an image being acquired through a camera of the electronic device;
detecting brightness information on a plurality of areas of the preview image;
identifying, among the plurality of areas of the preview image, a first area for determining an auto focus (AF) area, based on an attribute of each of the plurality of areas;
identifying, among the plurality of areas, at least one area with a second attribute corresponding to a first attribute of the first area; and
displaying, over the preview image, a second area including the at least one area as the AF area,
wherein the first attribute is regarding first brightness information comprised in the brightness information on the plurality of areas, and wherein the second attribute is regarding second brightness information comprised in the brightness information on the plurality of areas.

9. The method of claim 8, wherein the at least one area is disposed on a surrounded area of the first area, and wherein the second area further comprises the first area.

10. A method for use in an electronic device, comprising:
acquiring an image including a first focus detection area while the electronic device is in a first focus state;
displaying the image on a display of the electronic device;
detecting brightness information on a plurality of areas of the image;
detecting an input for tracking a subject depicted in the image, wherein the input selects a first area regarding a first attribute in the image in which the subject is depicted;
changing the first focus state to a second focus state for tracking the subject in response to the input, wherein the second focus state is associated with a second focus detection area regarding a second attribute; and
changing the first focus detection area to a second focus detection area based on the brightness information associated with the area, wherein the first attribute is regarding first brightness information comprised in the brightness information on the plurality of areas, and wherein the second attribute is regarding second brightness information comprised in the brightness information on the plurality of areas.

11. The method of claim 10, wherein when the electronic device is in the first focus state, the focus detection area is located in a central position of the image.

12. The method of claim 10, wherein detecting the input for changing the first focus state to the second focus state includes sensing a signal generated by an input/output module of the electronic device and identifying a location of the input based on the signal.

13. The method of claim 10, further comprising moving the focus detection area in accordance with movement of the subject while the electronic device is in the second focus state.

14. The method of claim 10, further comprising changing the first focus state to the second focus state in response to detecting a subsequent input.

* * * * *